(12) United States Patent
Lee et al.

(10) Patent No.: US 7,715,295 B2
(45) Date of Patent: May 11, 2010

(54) OPTICAL DISC REPRODUCING APPARATUS FOR CORRECTING ASYMMETRIC ERRORS IN DATA REPRODUCED FROM OPTICAL DISCS

(75) Inventors: Jung Hyun Lee, Suwon-si (KR); Eing Seob Cho, Suwon-si (KR); Eun Jin Ryu, Suwon-si (KR); Jun Jin Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 11/528,475

(22) Filed: Sep. 28, 2006

(65) Prior Publication Data
US 2007/0195675 A1  Aug. 23, 2007

(30) Foreign Application Priority Data
Feb. 21, 2006  (KR) ..................... 10-2006-0016828

(51) Int. Cl.
*G11B 7/00* (2006.01)
(52) U.S. Cl. .................................. 369/59.22
(58) Field of Classification Search .................. None
See application file for complete search history.

(56) References Cited

U.S. PATENT DOCUMENTS

| | | | | |
|---|---|---|---|---|
| 6,215,751 B1 * | 4/2001 | Tsuchinaga | ............... | 369/47.35 |
| 6,324,144 B1 * | 11/2001 | Won et al. | ................ | 369/59.15 |
| 6,396,788 B1 * | 5/2002 | Feyh et al. | ............... | 369/59.22 |
| 6,934,234 B2 * | 8/2005 | Lai | ......... | 369/53.35 |
| 2002/0181374 A1 * | 12/2002 | Lai | ......... | 369/53.35 |
| 2004/0141449 A1 * | 7/2004 | Cho et al. | ................ | 369/59.16 |
| 2004/0156293 A1 * | 8/2004 | Pozidis et al. | ............ | 369/59.22 |
| 2005/0242890 A1 * | 11/2005 | Wu et al. | ..................... | 331/18 |

FOREIGN PATENT DOCUMENTS

| JP | 2003-151219 A | 5/2003 |
|---|---|---|
| KR | 10-2001-0035777 A | 5/2001 |
| KR | 10-2004-0099951 A | 12/2004 |
| KR | 10-2004-0110090 A | 12/2004 |
| KR | 10-2005-0026320 A | 3/2005 |

* cited by examiner

*Primary Examiner*—Peter Vincent Agustin
(74) *Attorney, Agent, or Firm*—Sughrue Mion, PLLC

(57) ABSTRACT

An optical disc reproducing apparatus includes an A/D converter; an asymmetry compensator for detecting 4T sampling signals; a phase locked loop including a frequency detector that counts and detects run-length signals from the digital signals and compensates frequency errors of the digital signals; a binary module including a Viterbi decoder, a slicer, and a minimum T compensator that compensates the digital signal with a minimum signal having a unit cycle; an equalizer; an adaptive level error detector detecting a base level of the Viterbi decoder from both an input signal into the equalizer and an output signal from the Viterbi decoder, and computing a filtering coefficient of the equalizer from the base level; and a signal quality measurer measuring a jitter or an SbER of the digital signal.

13 Claims, 16 Drawing Sheets

| Index | Pattern T(F) | Pattern F(T) | |
|---|---|---|---|
| 1 | 001110000 | 001100000 | 1 |
| 2 | 011110000 | 011100000 | 1 |
| 3 | 111110000 | 111100000 | 1 |
| 4 | 001110001 | 001100001 | 1 |
| 5 | 011110001 | 011100001 | 1 |
| ... | ... | ... | ... |
| 19 | 00111001100 | 00110011100 | 2 |
| 20 | 01111001100 | 01110011100 | 2 |
| 21 | 11111001100 | 11110011100 | 2 |
| 22 | 00111001110 | 00110011110 | 2 |
| 23 | 01111001110 | 01110011110 | 2 |
| ... | ... | ... | ... |
| 50 | 1000110011110 | 10000011001110 | 3 |
| 51 | 1100110011110 | 11001011001110 | 3 |
| 52 | 0000110011111 | 00000101001111 | 3 |
| 53 | 1000110011111 | 10000101001111 | 3 |
| 54 | 1100110011111 | 11001011001111 | 3 |

OPTICAL DISC REPRODUCING APPARATUS FOR CORRECTING ASYMMETRIC ERRORS IN DATA REPRODUCED FROM OPTICAL DISCS

CROSS-REFERENCE TO RELATED APPLICATION

This application claims priority from Korean Patent Application No. 10-2006-0016828, filed on Feb. 21, 2006, in the Korean Intellectual Property Office, the entire disclosure of which is incorporated herein by reference.

BACKGROUND OF THE INVENTION

1. Field of the Invention

The present invention relates to an optical disc reproducing apparatus, which detects binary data from analog signals obtained from an optical disc under various kinds of optical disc environments including a high-density disc environment such as 15 GB in a 12 cm diameter disc by supporting Run Length Limited (RLL)(1,10) and RLL(2,10) codes, a 5-tap partial response maximum likelihood (PRML) sixteen levels, an asymmetric compensating operation under such RLL code environments, and a minimum T signal compensating operation.

2. Description of the Related Art

With the onset of the multimedia era, the need for storing and transmitting a large quantity of digital data has increased. Accordingly, an optical disc such as a digital video disc (DVD) has been widely studied in the art. The current DVD market is steadily growing, being divided into a computer industry that desires to adopt a DVD-ROM and a home appliance industry that intends to promote a DVD-video. Additionally, the DVD extends an applicable sphere as a DVD-R (recordable), a DVD-RW (rewritable), and a DVD-RAM (random access memory) appear on the market.

Such kinds of conventional optical discs may often be confronted with various problems as follows. When data stored in the optical disc are reproduced, analog radio frequency (RF) signals under reproduction may frequently exhibit an asymmetric waveform. Furthermore, this asymmetric phenomenon may give rise to other unfavorable phenomena such as jitter, non-linear bit transition, DC transition, and inter-symbol interference (ISI) between symbols of reproduced data. Such phenomena may make it difficult to execute the detection and correction of frequency errors and phase errors, thus causing the distortion of reproduced signals. A conventional optical disc reproducing apparatus has typically used a digital sum value (DSV) algorithm to correct such asymmetric errors.

However, the conventional DSV algorithm does not always execute an exact correction of the asymmetric errors under various code environments such as RLL(1,10) and RLL(2,10). For example, the conventional DSV algorithm may often fail to exactly detect asymmetric errors in the case of 4T sampling signals reproduced in the variable frequency oscillator (VFO) sector of the optical disc.

Furthermore, the conventional optical disc reproducing apparatus does not support an integrated solution for both RLL(1,10) and RLL(2,10) codes. Therefore, two separate and independent code detectors, namely, adding an RLL(1,10) detector to an existing RLL(2,10) detector, are used to support the integrated solution. This configuration of the detectors may, however, be inefficient in circuit area use and power consumption.

Additionally, a 4-Tap partial response maximum likelihood (PRML) structure of the conventional optical disc reproducing apparatus may fail to execute the optical disc reproduction under a high-density environment of more than 15 GB in a 12 cm diameter disc.

Additionally, a frequency detector of the conventional optical disc reproducing apparatus may fail to effectively detect frequency errors under such a high-density environment with a frequent ISI and a high noise. Also, a delay in frequency locking timing may interrupt a stable phase locked loop (PLL) operation.

Additionally, an asymmetry compensator of the conventional optical disc reproducing apparatus may be unavailable for some optical discs such as DVD-RAM, thus putting restrictions on reproducible kinds of the optical disc.

Additionally, the above-mentioned detector of the conventional optical disc reproducing apparatus requires a high-priced external measurer to measure a signal quality, therefore, actual measurement of the signal quality is not simple.

Additionally, a minimum T compensator of the conventional optical disc reproducing apparatus may be not operable under an RLL(1,10) code environment.

To overcome the above-discussed problems, an improved optical disc reproducing apparatus capable of operating under various disc environments and capable of executing an exact and effective reproduction under a high-density environment with a frequent ISI and a high noise is required in the art.

SUMMARY OF THE INVENTION

One aspect of the present invention is to provide an optical disc reproducing apparatus capable of operating by supporting both an RLL(1,10) code and an RLL(2,10) code.

Another aspect of the present invention is to provide an optical disc reproducing apparatus capable of executing an effective disc reproduction under a high-density environment of more than 15 GB in a 12 cm diameter disc by supporting a 5-Tap PRML structure.

Still another aspect of the present invention is to provide an optical disc reproducing apparatus capable of effectively detecting frequency errors under a high-density environment with a frequent ISI and a high noise.

Still another aspect of the present invention is to provide an optical disc reproducing apparatus capable of executing an asymmetric compensating operation in response to an RLL (1,10) environment.

Still another aspect of the present invention is to provide an optical disc reproducing apparatus capable of executing a minimum T signal compensating operation under 3T and 2T environments in response to an RLL(1,0) code.

In order to achieve the above and other aspects, one exemplary, non-limiting embodiment of the present invention provides an optical disc reproducing apparatus, which comprises: an A/D converter which converts analog RF signals obtained from an optical disc to digital signals; an asymmetry compensator which detects 4T sampling signals, a polarity of which changes in a four-times cycle than a sampling cycle, among the digital signals, and compensates a level of the digital signals according to counted asymmetric error values; a phase locked loop which includes a frequency detector that counts and detects run-length signals from the digital signals and compensates frequency errors of the digital signals; a binary module which includes a Viterbi decoder that detects binary data from the digital signals, a slicer that determines the binary data depending on a predetermined threshold value, and a minimum T compensator that compensates the digital signal with a minimum signal having a unit cycle; an equalizer which equalizes a specific frequency of the digital signal; an adaptive level error detector which detects a base level of the Viterbi decoder from both an input signal into the equalizer and an output signal from the Viterbi decoder, and computes a filtering coefficient of the equalizer from the base level; and a signal quality measurer which measures a jitter or a simulated bit error rate (SbER) of the digital signal.

DETAILED DESCRIPTION OF THE INVENTION

Figure 1:
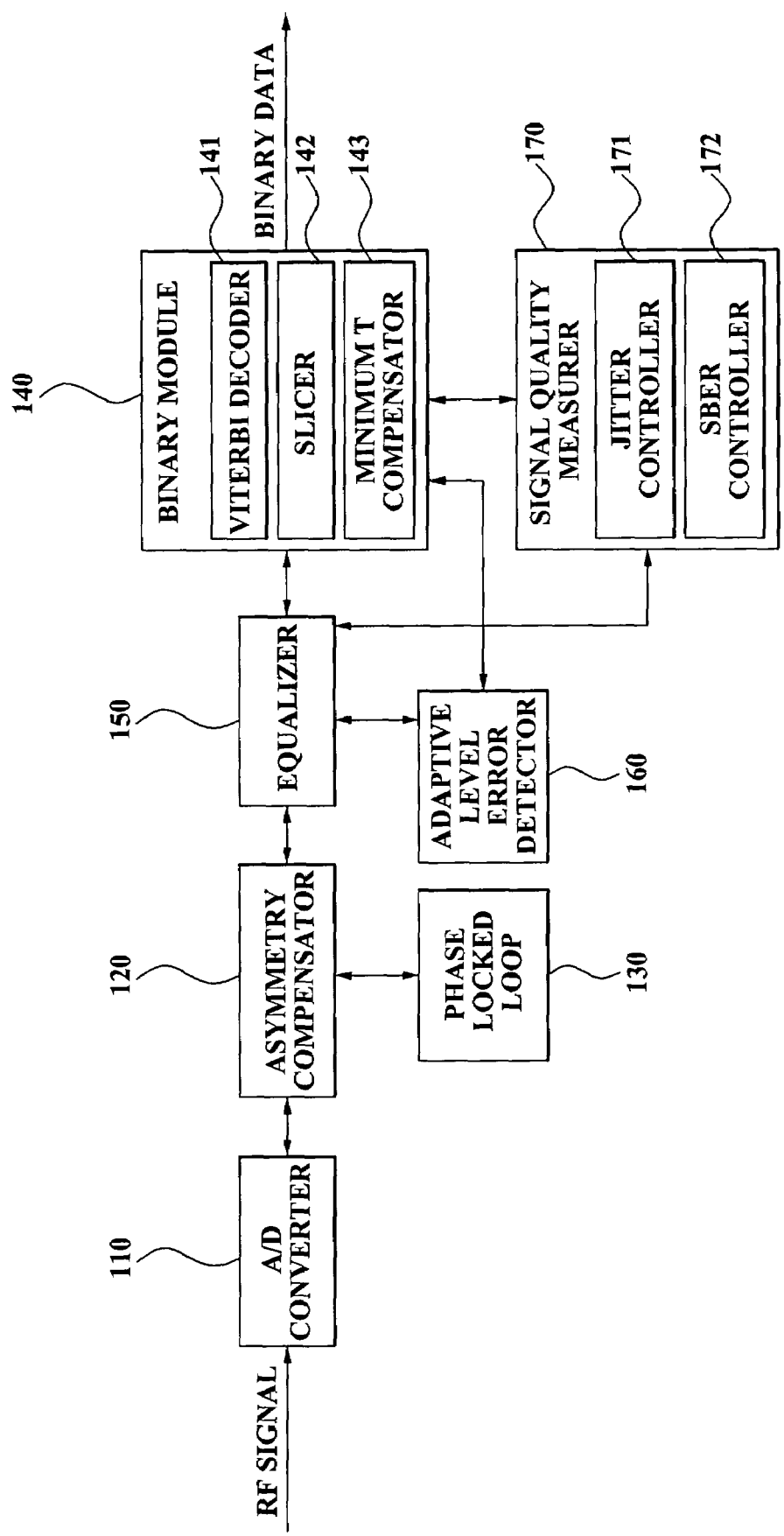
FIG. 1 is a view that illustrates an optical disc reproducing apparatus according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a view that illustrates an optical disc reproducing apparatus according to an exemplary embodiment of the present invention.

Referring to FIG. 1, the optical disc reproducing apparatus of the current embodiment includes an A/D converter 110, an asymmetry compensator 120, a phase locked loop (PLL) 130, a binary module 140, an equalizer 150, an adaptive level error detector 160, and a signal quality measurer 170. The binary module 140 includes a Viterbi decoder 141, a slicer 142, and a minimum T compensator 143. The signal quality measurer 170 includes a jitter controller 171 and an SbER controller 172.

The A/D converter 110 is a device that converts analog RF signals, extracted from an optical disc, to digital signals by sampling the analog RF signals in a predetermined sampling cycle.

The asymmetry compensator 120 detects 4T sampling signals, a polarity of which changes in a four-times cycle than the sampling cycle, among the digital signals. The asymmetry compensator 120 also calculates asymmetric error values from the 4T sampling signals and counts them. Then the asymmetry compensator 120 compensates a level of the digital signals according to the counted asymmetric error values.

The asymmetry compensator 120 may use a digital sum value (DSV) algorithm for the asymmetric error compensation. The DSV algorithm is a procedure for computing DSVs and then deciding whether they are asymmetric errors or not. The DSV is a value that indicates how much direct current components are contained in the digital signals.

To explain the DSV algorithm in detail, an optical recording/reproducing system converts the analog RF signals obtained in the optical disc into the digital signals. Then the system computes the average of two digital signals detected in sequence. If the average is positive, a polarity is assigned to "1". And a polarity of a negative average is assigned to "−1." Such polarities are counted and accumulated. If the accumulated value of the polarity exceeds a pre-established threshold value, this is regarded as the occurrence of the asymmetric error. Finally, input signals are compensated.

This technique of compensating the asymmetric errors by using the DSV algorithm has been disclosed in the Korean Patent Publication No. 2001-0035777. The DSV algorithm in the above disclosure may fail to execute the asymmetric error compensation under the RLL(1,10) environment. The asymmetry compensator 120 of the present invention is capable of executing such asymmetric error compensation in response to the RLL(1,10) environment. Related explanations will follow referring to FIGS. 2 to 6.

Figure 2:
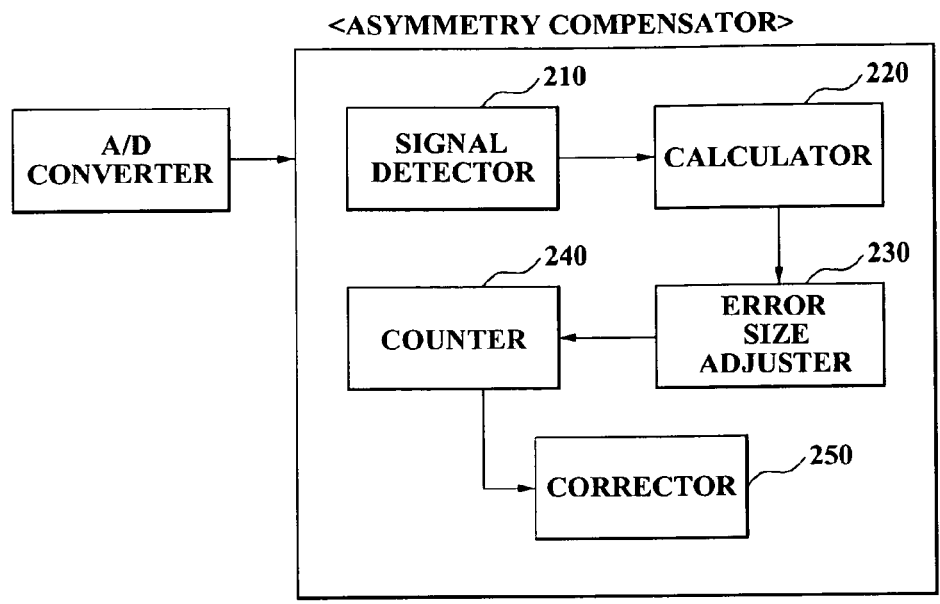
FIG. 2 is a block diagram that illustrates an asymmetry compensator according to an exemplary embodiment of the present invention.

FIG. 2 is a block diagram that illustrates an asymmetry compensator according to an exemplary embodiment of the present invention.

Referring to FIG. 2, the asymmetry compensator 200 of an exemplary embodiment of the invention includes a signal detector 210, a calculator 220, an error size adjuster 230, a counter 240, and a corrector 250.

The signal detector 210 extracts the 4T sampling signals from the digital signals that the A/D converter outputs. The 4T sampling signal means a digital signal in a four times sampling region every half cycle of the analog RF signal. That is, when the sampling cycle of the A/D converter is indicated by "T", a digital signal that changes its polarity in a 4T cycle may become the 4T sampling signal.

The calculator 220 computes the asymmetric error values by adding selected ones among the 4T sampling signals. Because of the 4T sampling signals, eight digital signals can be detected from every cycle of the analog RF signal. The calculator 220 may add first, fourth, fifth, and eighth digital signals among eight digital signals and then compute the asymmetric error value. Unless the asymmetric error happens, the asymmetric error value is computed to "0". If the asymmetric error happens, the asymmetric error value is computed to a predetermined value except "0."

To compute the asymmetric error value, the calculator 220 may add all of eight digital signals, not first, fourth, fifth, and eighth only. Furthermore, the calculator 220 may compute the asymmetric error value by adding two symmetric digital signals on opposite sides of a point where the size of the analog RF signal is zero.

The error size adjuster 230 regulates the size of the asymmetric error value by multiplying a certain adjustment coefficient. The magnitude of the adjustment coefficient may be predetermined. If the adjustment coefficient is determined to be "1", the asymmetric error value is transmitted to the counter 240 as it is. If the adjustment coefficient is determined to be "0.5", the asymmetric error value is reduced in half and transmitted to the counter 240. Depending on the applicable spheres of the optical disc reproducing apparatus of the invention, the magnitude of the adjustment coefficient may be arbitrarily determined by those skilled in the art.

The counter 240 counts the asymmetric error values by accumulating them as they are outputted from the error size adjuster 230.

Unless the asymmetric error values fall within a predetermined critical range, the corrector 250 adjusts a signal level of the digital signals outputted from the A/D converter by the asymmetric error values. The asymmetric errors are therefore compensated. When executing the asymmetric error compensation, the corrector 250 may renew the asymmetric error value that the counter 240 has counted.

Figure 3:
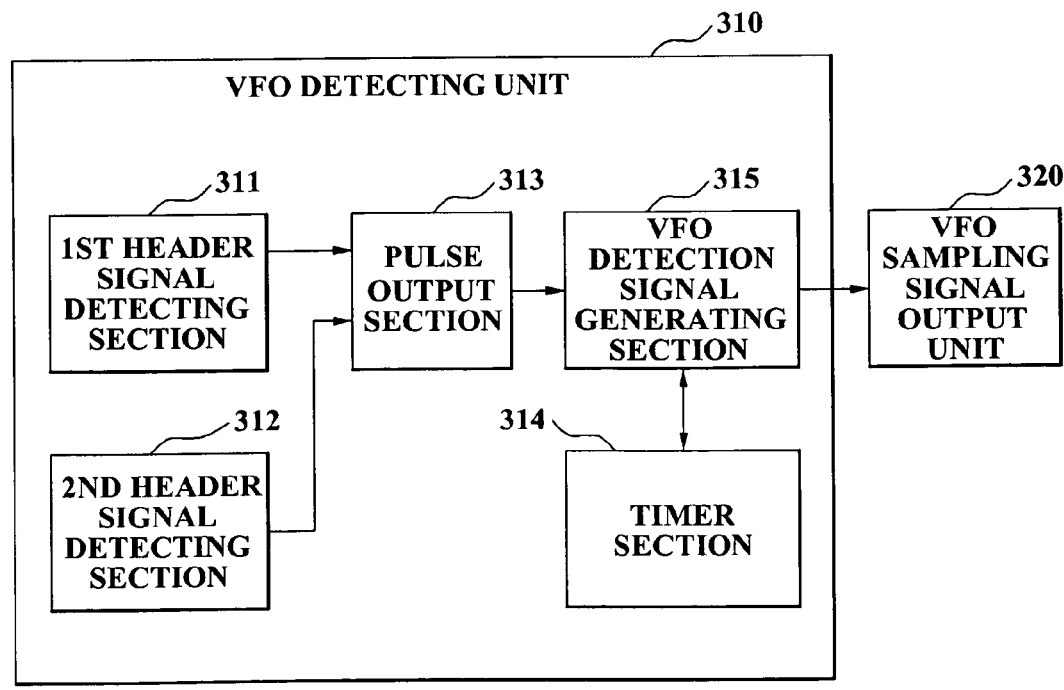
FIG. 3 is a block diagram that illustrates a signal detector of the asymmetry compensator according to an exemplary embodiment of the present invention.

FIG. 3 is a block diagram that illustrates a signal detector of the asymmetry compensator according to an exemplary embodiment of the present invention.

Referring to FIG. 3, the signal detector of an exemplary embodiment of the invention includes a variable frequency oscillator (VFO) detecting unit 310 and a VFO sampling signal output unit 320. The VFO detecting unit 310 has a first header signal detecting section 311, a second header signal detecting section 312, a pulse output section 313, a timer section 314, and a VFO detection signal generating section 315.

The VFO detecting unit 310 outputs VFO detection signals while a variable frequency oscillator (VFO) sector of the optical disc is reproduced. The VFO sector stores VFO signal data in the sectors of the optical disc. The VFO signal allows the determination of whether a region of the optical disc is a land or a groove. Namely, a negative VFO signal is determined to be a land region, and a positive VFO signal is determined to be a groove region. Also, the VFO signal becomes a base signal used for generating exact synchronous signals in the phase locked loop (130 in FIG. 1). For this, the VFO signal changes its polarity in a 4T cycle.

The VFO sector is located at a header field and a user data field in the optical disc, such as the DVD-RAM. The header field is classified into a header peak area and a header bottom area. Such header areas allow knowing whether the next track is the land or the groove. Namely, if the next track is the land, a header peak signal is generated, and if the next track is the groove, a header bottom signal is generated. The VFO sector is located at respective front portions of the header peak area, the header bottom area, and the user data field.

The first and second header signal detecting sections 311 and 312 detect respectively the header peak signal reproduced at the header peak area and the header bottom signal reproduced at the header bottom area.

The pulse output section 313 outputs a control pulse when at least one of the header peak signal and the header bottom signal is detected in at least one of the first and second header signal detecting sections 311 and 312.

The timer section 314 begins counting actions when the control signal is inputted from the pulse output section 313. Then the timer section 314 counts an elapsed time from a point when the header peak signal or the header bottom signal is detected.

If a time counted by the timer section 314 exceeds a first time, the VFO detection signal generating section 315 outputs the VFO detection signal for a predetermined time. Furthermore, if a second and a third times are pre-established to the respective VFO sectors located at the header bottom area and the user data field, the VFO detection signal generating section 315 can output the VFO detection signal at each reproducing time.

The VFO sampling signal output unit 320 outputs the digital signals, outputted from the A/D converter, as the 4T sampling signals while the VFO detection signal is inputted from the VFO detecting unit 310.

Figure 4:
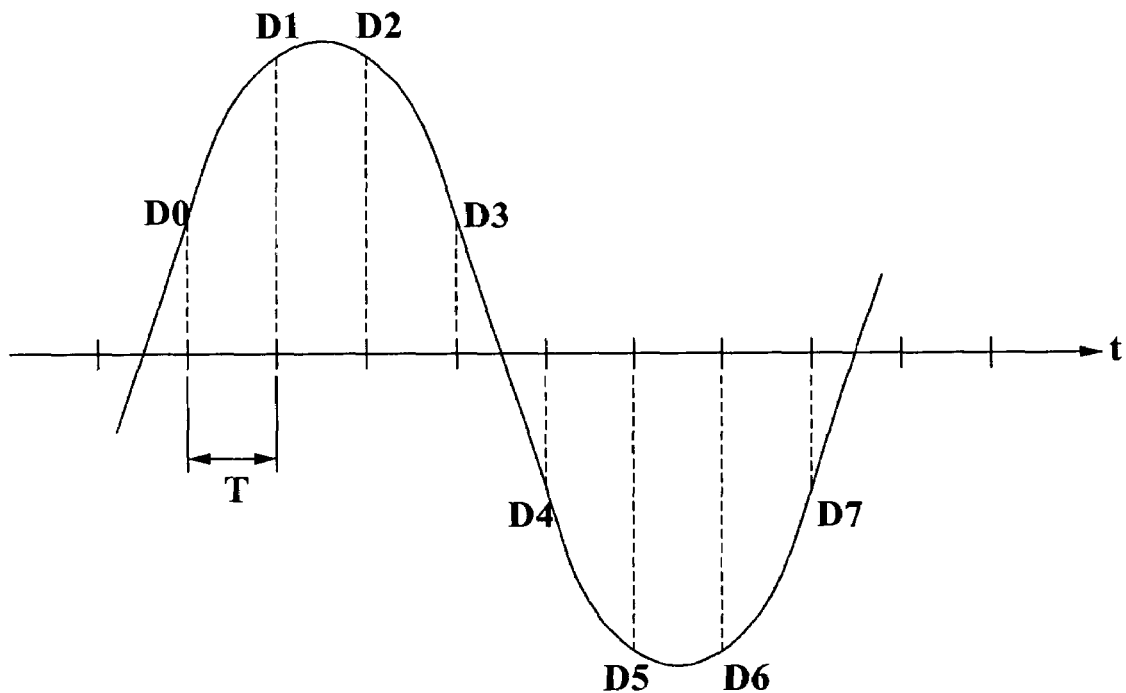
FIG. 4 is a view that illustrates a 4T sampling signal according to an exemplary embodiment of the present invention.

FIG. 4 is a view that illustrates a 4T sampling signal according to an exemplary embodiment of the present invention.

Referring to FIG. 4, eight sampling actions are carried out in a single cycle of the analog RF signal. Therefore, eight digital signals, i.e., D0 to D7, are detected from the A/D converter. Among them, the calculator 220 adds D0, D3, D4, and D7. The result of adding becomes the asymmetric error value. The calculator 220 may add all of D0 to D7, and also may add two symmetric signals, such as D3 and D4, on opposite sides of the zero point.

Figure 5:
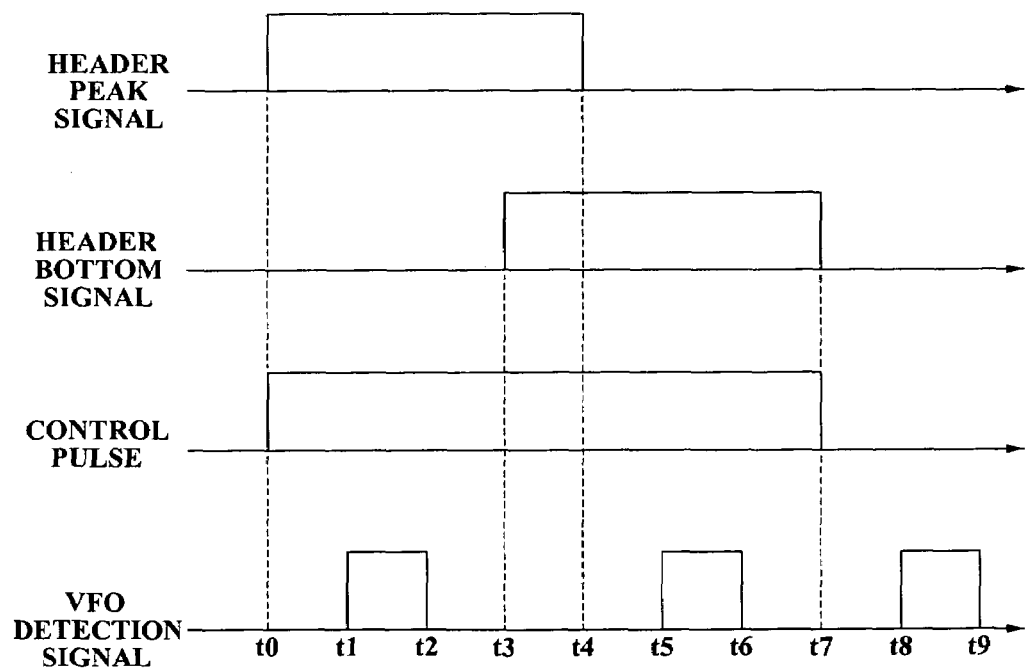
FIG. 5 is a view that illustrates signal waveforms used in the signal detector of the asymmetry compensator according to an exemplary embodiment of the present invention.

FIG. 5 is a view that illustrates signal waveforms used in the signal detector of the asymmetry compensator according to an exemplary embodiment of the present invention.

Referring to FIG. 5, the header peak signal is detected for a time interval between t0 and t4, and the header bottom signal is detected for another time interval between t3 and t7. Therefore, the pulse output section 313 outputs the control pulse for a time interval between t0 and t7.

The VFO detection signal generating section 315 outputs the VFO detection signal at a first time point t1 after a predetermined time elapses from an initial time point t0 when the control pulse is inputted. The first time point t1 is determined by considering a data reproducing and transmitting time, a converting time, and so forth. Since the output time of the VFO detection signal is delayed by a time difference between t1 and t0, an exact detection of the 4T sampling signal is possible.

Since no 4T sampling signals are detected after the VFO sector is reproduced, the conventional DSV algorithm may be favorably used to compensate the asymmetric errors. For this, the VFO detection signal generating section 315 outputs the VFO detection signal only for a time difference between t2 and t1, corresponding to a length of the VFO sector. Consequently, , the asymmetric error values are computed, accumulated, and counted only while the VFO detection signal is outputted, and the asymmetric error compensating operation is executed to compensate signal levels by using counting results.

Additionally, since the VFO sector exists in the header bottom area, the VFO detection signal is outputted for a time difference between t6 and t5 from t5 corresponding to the header bottom area. That is, when a time counted from t0 by the timer section 314 is equal to a difference between t5 and t0, the VFO detection signal generating section 315 outputs again the VFO detection signal. Also, when a counting time is equal to a difference between t6 and t0, the output of the VFO detection signal is stopped.

Since the VFO sector further exists in the user data field, the VFO detection signal is outputted again after a time elapses by a difference between t8 and t0. Also, the output of the VFO detection signal is stopped again after a time elapses by a difference between t9 and t0.

Figure 6:
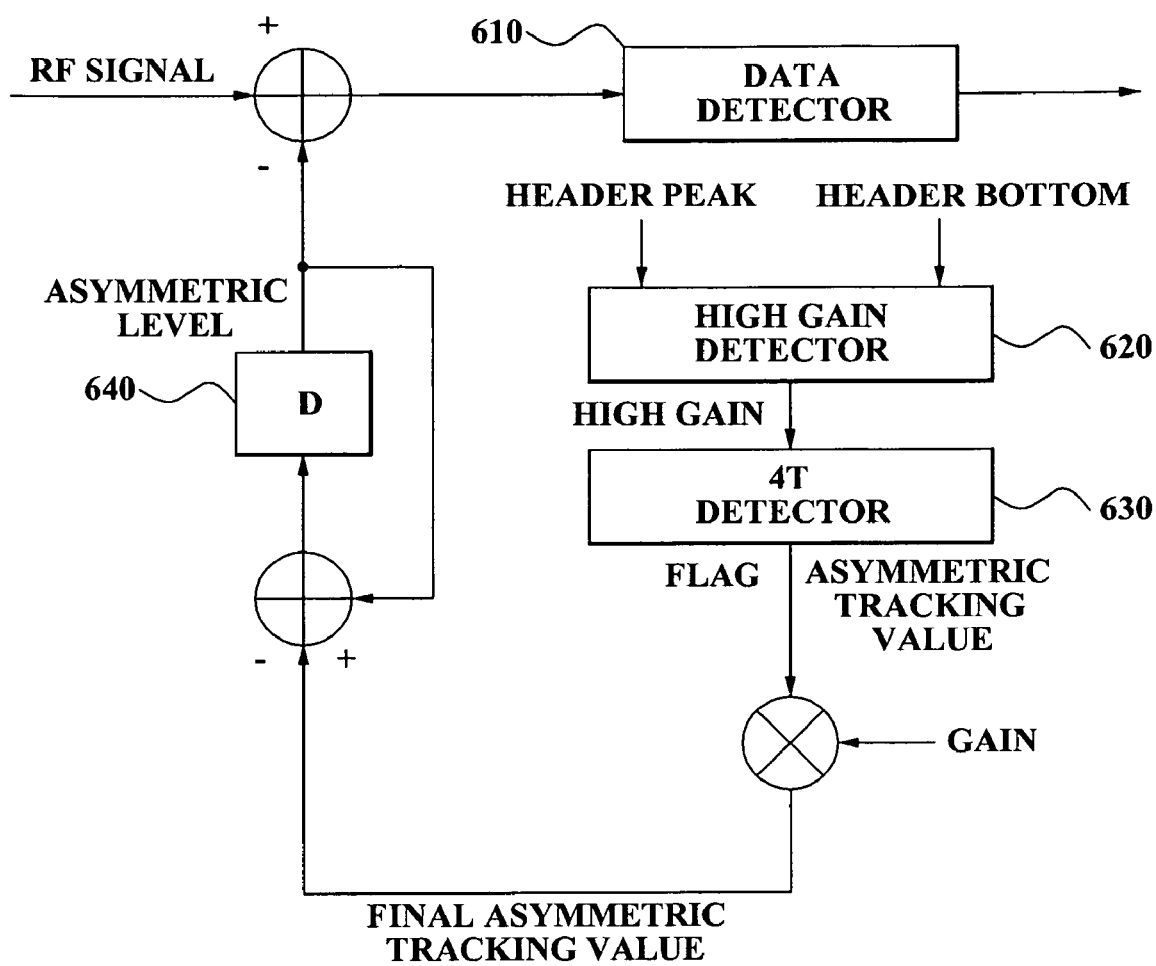
FIG. 6 is a view that illustrates a DSV method for an RLL(1,10) code according to an exemplary embodiment of the present invention.

A signal level compensating method by the asymmetric error detection of the aforementioned asymmetry compensator is fully described referring to FIG. 6.

FIG. 6 is a view that illustrates a DSV method for an RLL(1,10) code according to an exemplary embodiment of the present invention.

As shown in FIG. 6, the asymmetry compensator (120 in FIG. 1) may include a data detector 610, a high gain detector 620, a 4T detector 630, and a subtracter 640 by a functional classification.

The data detector 610 receives the digital signal converted from the analog RF signal. The high gain detector 620 detects high gains from the header peak and the header bottom. The 4T detector 630 detects the 4T sampling signal from the digital signal.

The 4T detector 630 creates a flag informing the detection of the 4T sampling signal in case where the high gain is "1". Whenever the flag is created, the 4T detector 630 adds four sample values of the 4T sampling signal and thus creates an asymmetric tracking value.

Since a single asymmetric tracking value is insufficient for satisfying accuracy, the 4T detector 630 may create a final asymmetric tracking value by multiplying a gain and the asymmetric tracking value.

The subtracter 640 subtracts the final asymmetric tracking value from the asymmetric level when the flag is created. However, if the flag is not created, the subtraction of the asymmetric tracking value is not carried out.

Thus the optical disc reproducing apparatus of the present invention can solve asymmetric tracking issues in the header sector and in the user data field under the RLL(2,10) environment by the operation of the asymmetry compensator.

The configuration and the operation of the asymmetric compensator of the present invention may be embodied to involve those of "apparatus for correcting defect level and asymmetric waveform level in optical disk system" disclosed in the Korean Patent Publication No. 2001-0035777.

The phase locked loop 130 shown in FIG. 1 includes a frequency detector, which counts and detects run-length signals from the sampling digital signals during a frequency detection cycle according to a run-length distribution density depending on a channel coding feature. Also, the frequency detector generates frequency errors during the frequency detection cycle through the count value of the run-length signals and other referential values, and compensates the frequency errors of the digital signals.

The configuration and the operation of the frequency detector are fully described hereinafter referring to FIGS. 7 to 13.

Figure 7:
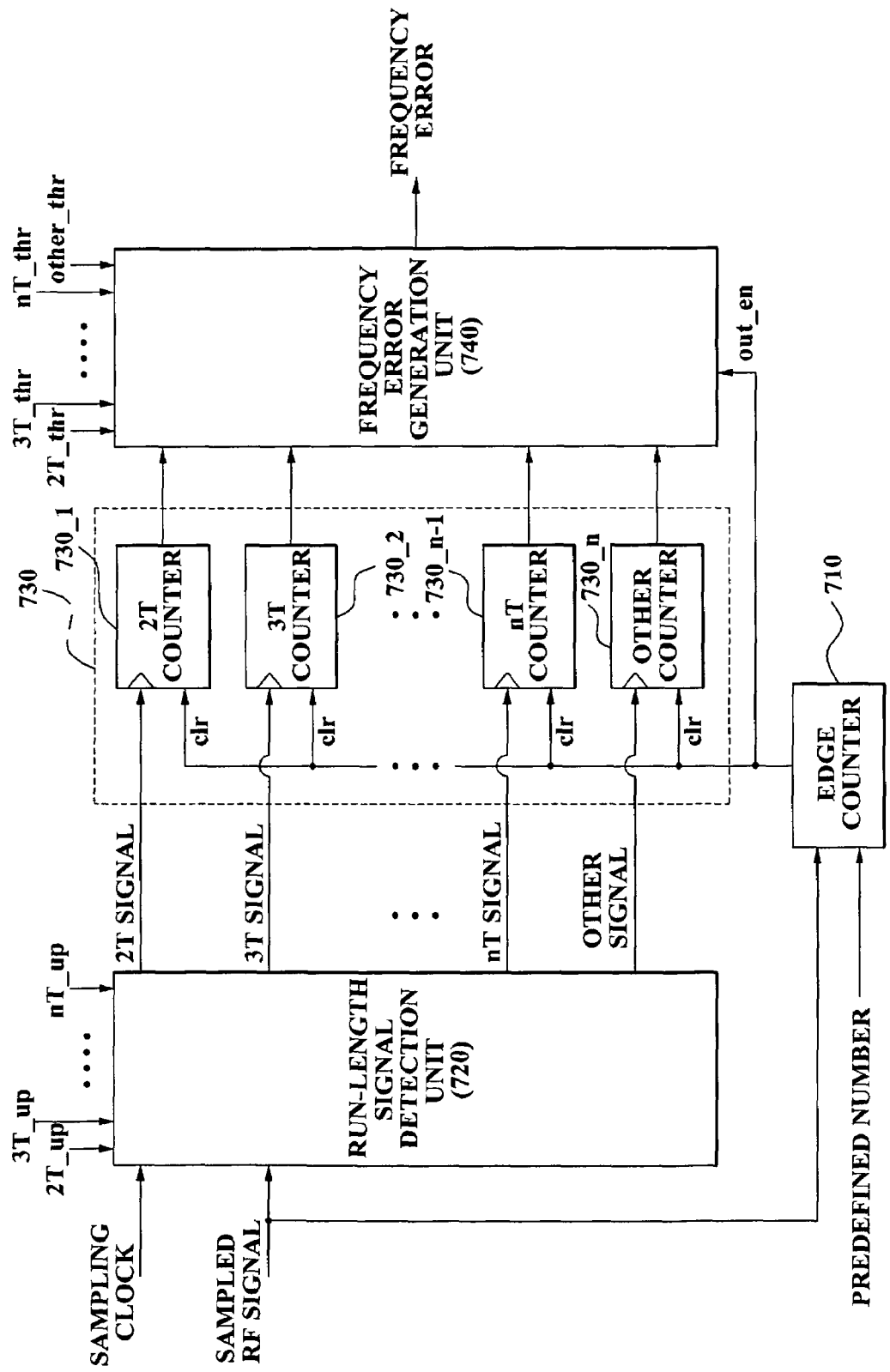
FIG. 7 is a block diagram that illustrates a frequency detector according to an exemplary embodiment of the present invention.

FIG. 7 is a block diagram that illustrates a frequency detector according to an exemplary embodiment of the present invention.

Referring to FIG. 7, the frequency detector includes an edge counter 710, a run-length signal detection unit 720, a counter unit 730, and a frequency error generation unit 740.

The run-length signal detection unit 720 receives the sampled RF signal from the A/D converter. The sampled RF signal means a digital signal sampled from the analog RF signal by the A/D converter, as discussed above. In the following descriptions referring to FIGS. 7 to 13, such a digital signal will be referred to as the sampled RF signal.

When the sampled RF signal is inputted, the edge counter 710 controls the frequency detection cycle by counting passing edges of the sampled RF signal. The passing edges include a rising edge and a falling edge. When a value counting the passing edges of the sampled RF signal reaches a predefined number, the edge counter 710 controls the frequency detection cycle by outputting a positive pulse.

After the positive pulse is outputted, the edge counter 710 clears the edge counting value and counts again the passing edges of the sampled RF signal to control the next frequency detection cycle. Unless the counting value reaches the predefined number, the output of the edge counter 710 always maintains "0". The positive pulse is transmitted to the counter unit 730 and the frequency error generation unit 740.

If the predefined number is high, an accuracy of evaluation is improved but a frequency error detection speed is reduced. If the predefined number is low, the accuracy is reduced but the speed is improved. Therefore, the predefined number may be determined on the basis of a range for evaluating the run-length distribution density with regard to the sampled RF signal.

The run-length signal detection unit 720 detects a run-length signal from the sampled RF signal based on the run-length distribution density predicted according to the channel coding feature of the optical disc reproducing system. Specifically, the run-length signal detection unit 720 divides a run-length region into at least two partitions, based on the predicted run-length distribution density. Then the run-length signal detection unit 720 detects the run-length signal of the RF signal, sampled during the frequency detection cycle, according to the run-length partitions.

In the run-length signal detection unit 720 exemplarily shown in FIG. 7, the run-length region is divided into (n-1) pieces of partitions from 2T to nT and the other partition.

Figure 8:
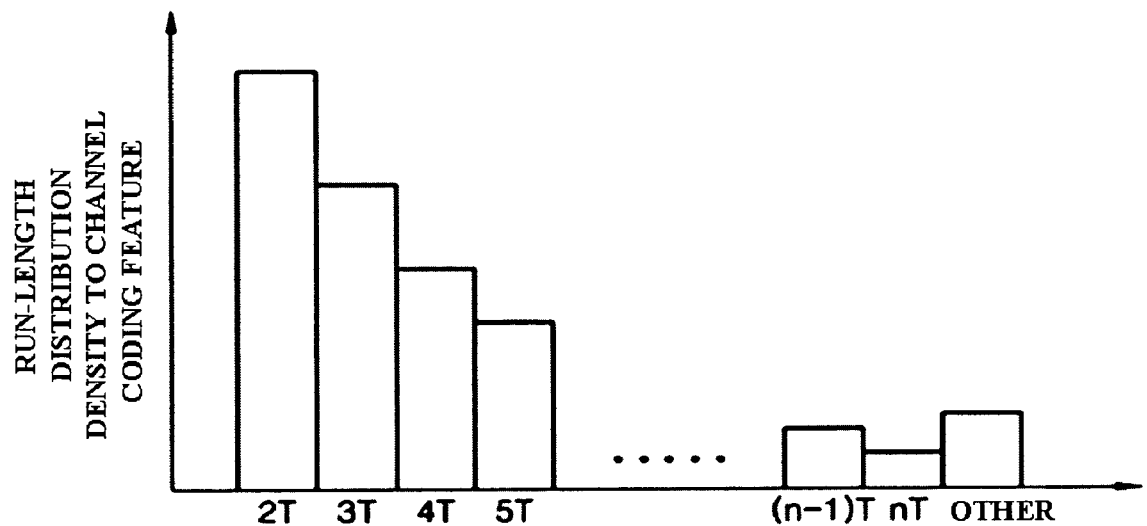
FIG. 8 is a view that illustrates a run-length distribution density to a channel coding feature of the optical disc reproducing apparatus according to an exemplary embodiment of the present invention.
Figure 9:
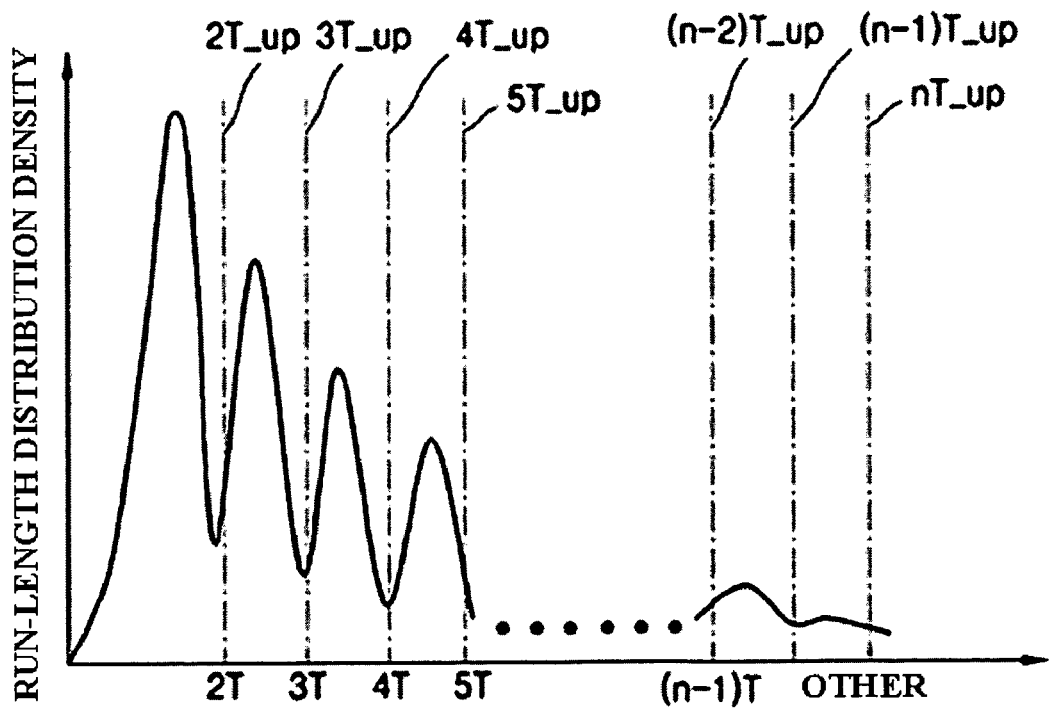
FIG. 9 is a view that illustrates run-length boundaries in the run-length distribution density.

In case of the run-length distribution density shown in FIG. 8, the run-length signal detection unit 720 may divide the run-length region into n pieces of partitions by using predefined run-length boundaries (2T_up, 3T_up, ..., nT_up) as shown in FIG. 9.

The number "n" may be determined on the basis of the maximum run-length of various types of the optical discs employed in the apparatus of the invention. For example, if the apparatus of the invention uses a CD, a DVD, a BD (blue ray), and a HD-DVD, the maximum run-length of which is 11T, 11T, 8T, and 11T, respectively, the number "n" is determined to "11".

Alternatively, the run-length signal detection unit 720 may divide the run-length region into the minimum run-length partition (e.g., 2T) and the other run-length partitions so as to detect the run-length signal.

Furthermore, the run-length signal detection unit 720 may divide the run-length region into the most frequently generating run-length partition and the other run-length partitions. In FIGS. 8 and 9, the 2T run-length partition becomes the most frequently generating run-length partition, however any other run-length partition may alternatively become the most frequently generating run-length partition.

The counter unit 730 includes at least one counter that counts the run-length signal detected in the run-length signal detection unit 720 during the frequency detection cycle. In a FIG. 7 example, the counter unit 730 has n pieces of counters (730_1~730_n) because the number of the run-length partitions used in the run-length signal detection unit 720 is "n". The number of the counters contained in the counter unit 730 depends on the number of the run-length partitions used in the run-length signal detection unit 720.

Accordingly, in the FIG. 7 example, since the run-length signal detection unit 720 uses (n-1) pieces of the partitions from 2T to nT and the other partition, the n pieces of the counters 730 includes a 2T counter 730_1 corresponding to the 2T run-length, a 3T counter 730_2 corresponding to the 3T run-length, an nT counter 730_n-1 corresponding to the nT run-length, and an other counter 730_n corresponding to the other run-length.

The 2T counter 730_1 counts up whenever the 2T signal outputted from the run-length signal detection unit 720 is a positive pulse. The 3T counter 730_2 counts up whenever the 3T signal outputted from the run-length signal detection unit 720 is a positive pulse. The nT counter 730_n-1' counts up whenever the nT signal outputted from the run-length signal detection unit 720 is a positive pulse. The other counter 730_n counts up whenever the other signal outputted from the run-length signal detection unit 720 is a positive pulse.

Such counting values from the 2T counter 730_1 to the other counter 730_n are cleared when the edge counter 710 provides a positive pulse thereto. Accordingly, the value counted by the 2T counter 730_1 indicates how many times the 2T run-length signal occurs during the frequency detection cycle. Similarly, the values counted by the 3T counter 730_2, the nT counter 730_n-1, and the other counter 730_n indicate respectively how many times the 3T run-length signal, the nT run-length signal, and the other run-length signal occur respectively during the frequency detection cycle.

If there are two run-length partitions that the run-length signal detection unit 720 uses, the counter unit 730 also has two counters corresponding to the run-length partitions to implement the above-discussed operation.

The frequency error generation unit 740 generates frequency errors during the frequency detection cycle by using predetermined threshold values (2T_thr~other_thr) as well as the aforesaid values counted by n pieces of the counters 730_1~730_n.

The threshold values (2T_thr~other_thr) are critical points determined on the basis of the predicted run-length distribution density that may appear in the run-length region during the frequency detection cycle. That is, if the frequency of the sampling clock outputted from the phase locked loop (130 shown in FIG. 1) is lower than a target frequency, the run-length distribution density in each run-length partition separated by the predefined run-length boundaries (2T_up, 3T_up, ..., nT_up) as shown in FIG. 9 may shift leftward as shown with a dotted line in FIG. 10.

Figure 11:
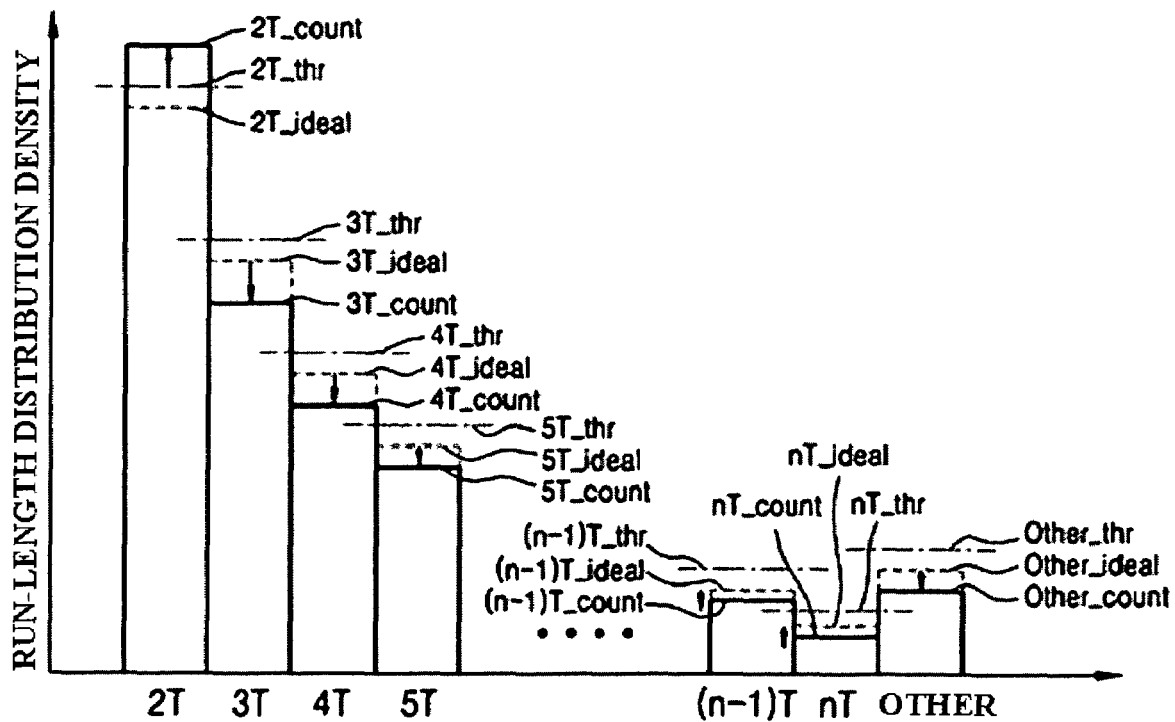
FIG. 11 is a view that illustrates a relation among a real signal count, a predicted signal count, and a threshold value when the run-length signal distribution is shifted as shown in FIG. 10.

As shown in FIG. 11, in this shifted run-length distribution density, except a real count 2T_count of the run-length signals occurring in the 2T run-length partition, remaining real counts (3T_count~other_count) of the run-length signals occurring in another run-length partitions may be decreased in comparison with predicted counts (3T_ideal~other_ideal).

Figure 10:
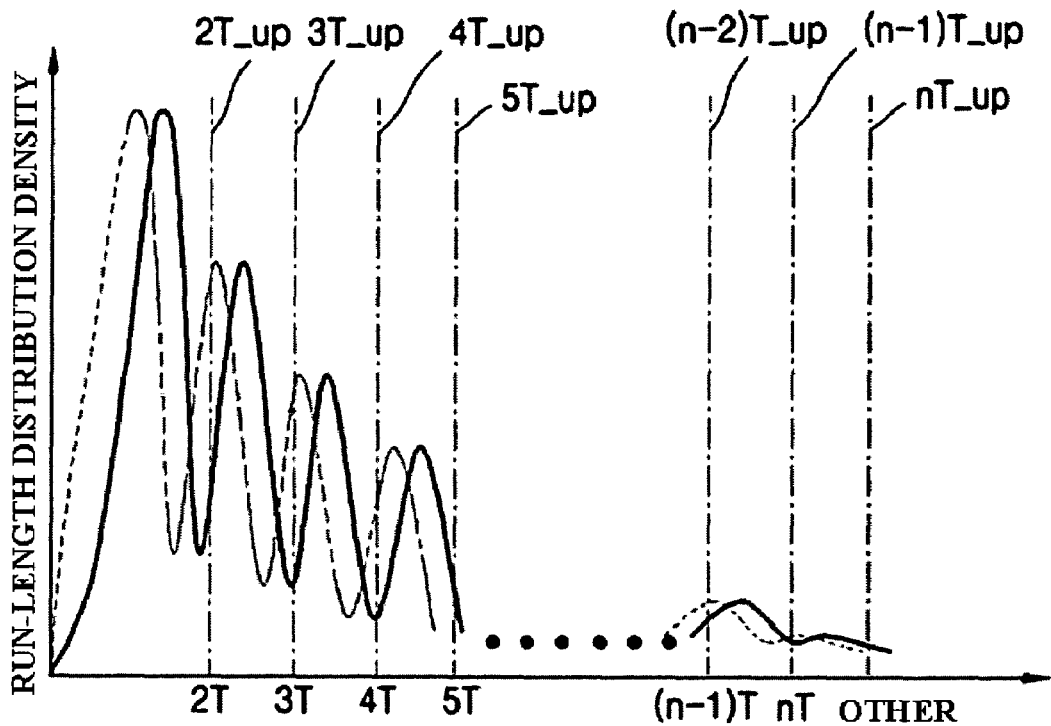
FIG. 10 is a view that illustrates a shift of a run-length signal distribution in the run-length distribution density when the frequency of a sampling clock is lower than a target frequency.

Therefore, a detection of the frequency errors uses the threshold values (2T_thr~other_thr) higher than the predicted run-length signal counts. FIG. 11 is a view that illustrates a relation among a real signal count (nT_count) detected in each run-length partition, a predicted signal count (nT_ideal), and a threshold value (NT_thr) determined on the basis of the predicted signal count (nT_ideal), when the run-length signal distribution is shifted as shown in FIG. 10.

Figure 12:
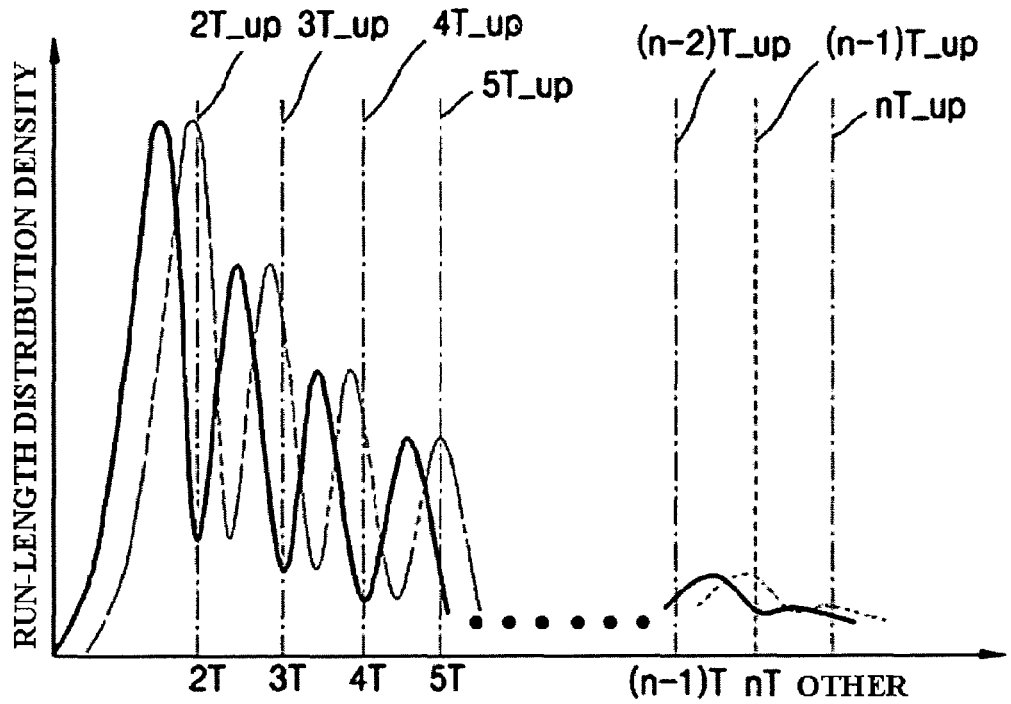
FIG. 12 is a view that illustrates a shift of a run-length signal distribution in the run-length distribution density when the frequency of a sampling clock is higher than a target frequency.

On the other hand, if the frequency of the sampling clock outputted from the phase locked loop (130 shown in FIG. 1) is higher than the target frequency, the run-length distribution density in each run-length partition may shift rightward as shown with a dotted line in FIG. 12. When the run-length signal distribution is shifted as shown in FIG. 12, a relation among a real signal count detected in each run-length partition, a predicted signal count, and a threshold value determined according to the predicted signal count is illustrated in FIG. 13.

Figure 13:
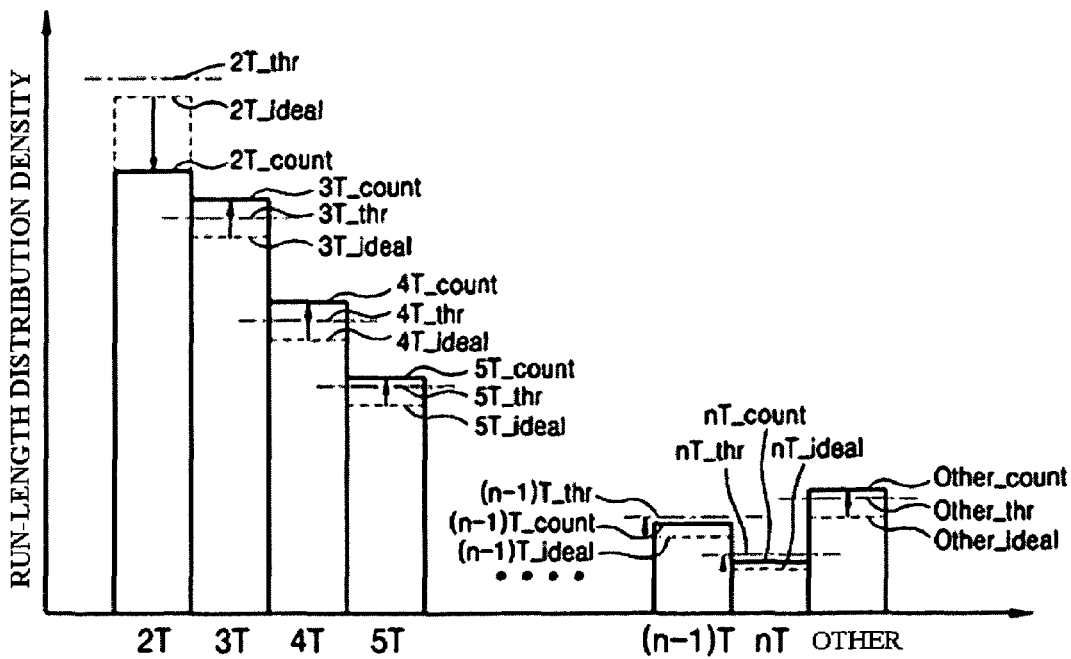
FIG. 13 is a view that illustrates a relation among a real signal count, a predicted signal count, and a threshold value when the run-length signal distribution is shifted as shown in FIG. 12.

As seen from FIG. 13, in a run-length partition corresponding to a relatively shorter run-length signal such as 2T, a count of actually occurring run-length signals may be decreased in comparison with the predicted count. Furthermore, in another run-length partition corresponding to a longer run-length signal than 2T, a count of actually occurring run-length signals may be increased in comparison with the threshold value determined on the basis of the predicted count.

If the run-length count and the threshold value sampling clock frequency obtained from the corresponding partition are higher than the target frequency, the count of the run-length partition corresponding to a run-length signal longer than 2T may be higher than the threshold value. Also, the count of the 2T partition and the count of the run-length partition corresponding to a run-length signal shorter than 2T may be lower than the threshold value. When the frequency of the sampling clock outputted in the PLL circuit is increased, the counts of the run-length partitions corresponding to shorter and shorter run-length signals may be lower than the corresponding threshold value in each partition.

Considering the threshold value and the count of actually detected run-length signals, the threshold value can be determined.

Returning to FIG. 1, the binary module 140 includes the Viterbi decoder 141, the slicer 142, and the minimum T compensator 143.

The Viterbi decoder 141 detects binary data from the digital signals. A partial response (PR) type of the Viterbi decoder 141 may be established to PR (a, b, c, d, e).

The slicer 142 detects the binary data based on a predetermined threshold value. To detect the binary data from the digital signal, the slicer 142 computes a slicing level signal by integrating an average of the digital signals, and the Viterbi decoder 141 compares the slicing level signal with the digital signal. Furthermore, the slicer 142 may detect the binary data directly from the output of the equalizer 150 to the slicing level signal. The Viterbi decoder 141 may also detect the binary data from the output of the equalizer 150.

That is, each component of the binary module 140 may become an independent data detector capable of detecting the binary data by itself. The speed of detecting the binary data from an input in the binary module is faster in order of the slicer 142, the minimum T compensator 143, and the Viterbi decoder 141. However, the efficiency of detecting the binary data follows the inverse order to the above.

The aforesaid binary module 140 may be embodied to involve a binary operation of a Viterbi decoder disclosed in the Korean Patent Publication No. 2005-0026320 entitled "Device and method for data reproduction".

When the digital signal has a smaller cycle than a unit cycle of the minimum signal corresponding to a code of the optical disc, the minimum T compensator 143 compensates the digital signal with the minimum signal having the unit cycle.

Specifically, if the unit cycle T of the minimum signal is 2T, the minimum T compensator 143 may remove a 1T digital signal by controlling a path of the 1T digital signal through a switch. Furthermore, if the unit cycle T of the minimum signal is 3T, the minimum T compensator 143 may remove both a 1T digital signal and a 2T digital signal by controlling their paths through the switch.

The minimum T compensator 143 may be embodied to involve the configuration and the operation of a conventional minimum T compensator disclosed in the Korean Patent Publication No. 2004-10090 entitled "Apparatus and method for detecting binary data."

The equalizer 150 equalizes a specific frequency of the digital signal.

The adaptive level error detector 160 detects a base level of the Viterbi decoder 141 from both an input signal into the equalizer 150 and an output signal from the Viterbi decoder 141. Additionally, the adaptive level error detector 160 computes a filtering coefficient of the equalizer 150 from the base level, the input signal of the equalizer, and the output signal of the equalizer.

The adaptive level error detector 160 may include a channel identifier and an adaptive processor. The channel identifier detects the base level of the Viterbi decoder 141 from both the input signal into the equalizer 150 and the output signal from the Viterbi decoder 141. The adaptive processor computes the filtering coefficient of the equalizer 150 from the base level, the input signal of the equalizer, and the output signal of the equalizer.

Hereinafter a configuration and an operation of the adaptive level error detector 160 are explained in detail referring to FIGS. 14 to 16.

Figure 14:
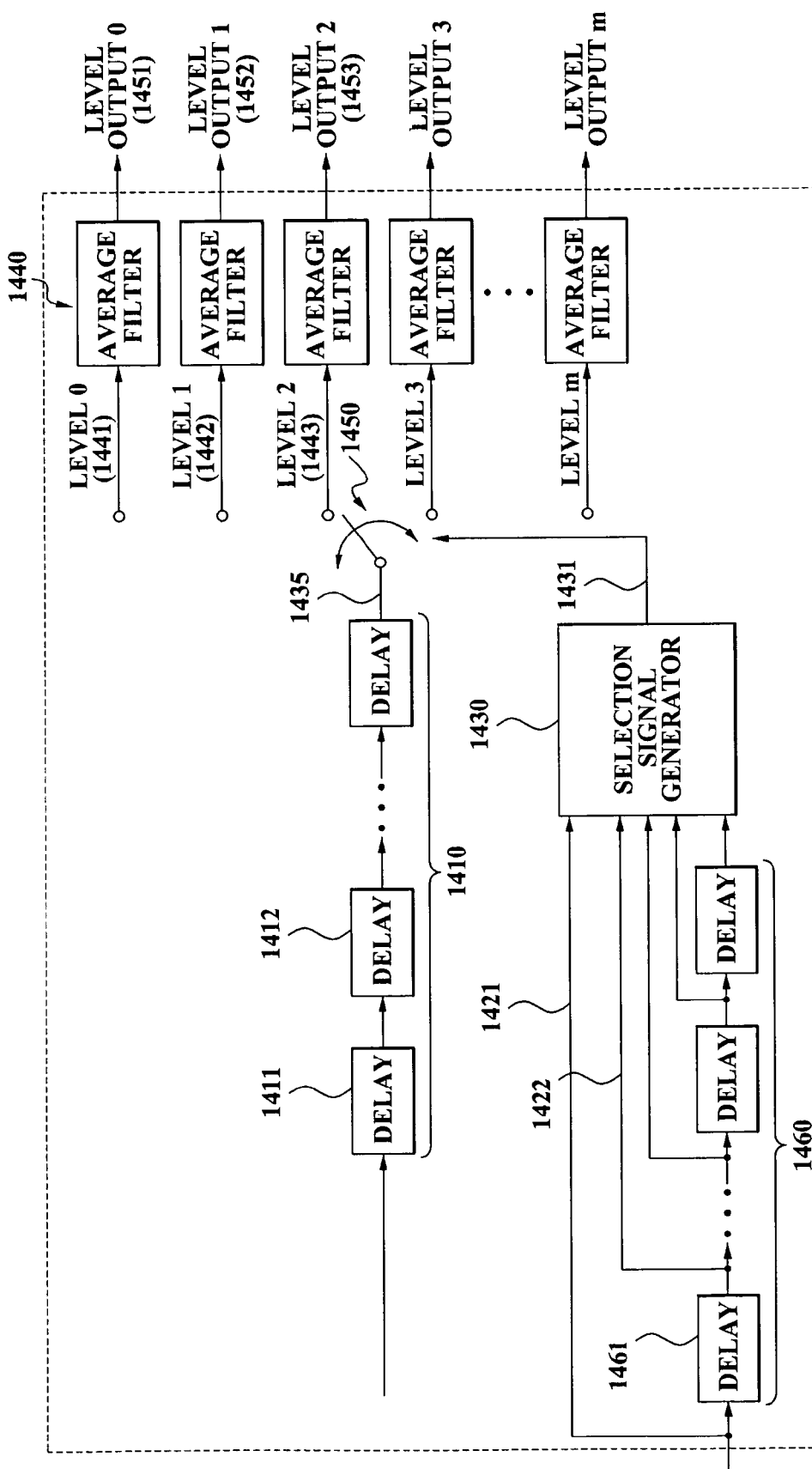
FIG. 14 is a block diagram that illustrates a channel identifier of an adaptive level error detector according to an exemplary embodiment of the present invention.

FIG. 14 is a block diagram that illustrates a channel identifier of an adaptive level error detector according to an exemplary embodiment of the present invention.

Referring to FIG. 14 together with FIG. 1, the channel identifier includes a selection signal generator 1430, a level selector 1450, and average filters 1440. The selection signal generator 1430 receives the output signals of the Viterbi decoder 141 and then generates a selection signal 1431. Here, the output signal of the Viterbi decoder 141 is a binary signal having "0" or "1" and the final output decoded by the Viterbi decoder 141. By the operation principle of the Viterbi decoder 141, the output signal of the Viterbi decoder 141 has a connection with the input signal thereof, namely, the output signal of the equalizer 150. This means that the output signal of the Viterbi decoder 141 may specify the kind of levels inputted into the Viterbi decoder 141. Therefore, the input of an adaptive level may be selectively used in the binary module 140 including the Viterbi decoder 141.

For example, when a signal level is generated by a PR(1,2,1) and a code type is (1,7), possible ideal level values are 4, 2, −2, and −4. If input signal levels are 4, 4, 4, 2, −2, −4, −4, −4, −2, 2, . . ., the output signals of the Viterbi decoder 141 may be 1, 1, 1, −1, −1, −1, −1, −1, 1, 1, . . . . Then, by performing a number of multiplexing operations equal to the number of the taps of the Viterbi decoder 141, the output signals of the Viterbi decoder 141 are 111, 11-1, 1-1-1, -1-1-1, . . . , which equate to 111, 110, 100, 000, in binary signals.

Thus these binary signals mean that 4, 2, −2, −4, . . . are inputted respectively. After all, 111, 110, 100, 000, . . . may be used as the selection signal specifying the kind of the input levels such as 4, 2, −2, −4, . . . .

The output signal of the Viterbi decoder 141, inputted into the channel identifier, is delayed and split by delays 1460, the number of which is smaller by one than that of taps of the Viterbi decoder, and then inputted into the selection signal generator 1430. The delayed input signals 1421, 1422, . . . are merged again by the selection signal generator 1430 and generate the selection signal 1431 in the form of the binary signal. For example, if the number of the taps of the Viterbi decoder 141 is three and if the number of the delays is two, the selection signal 1431 assumes the form of 111, 110, 100, 000, . . . . The output of the Viterbi decoder 141 is not produced immediately at a time, but produced after a computation time corresponding to a defined system clock elapses. The delays 1460 are therefore used because a delay time corresponding to the computation time should be allotted to the input signal of the channel identifier in order to select the input signal corresponding to the output signal of the Viterbi decoder 141.

Additionally, the selection signal 1431 may be removed in a case where it conforms to a removable Viterbi path according to conditions of the minimum signal. For example, in case of a three-tap structured Viterbi decoder using a (1,7) code, two selection signals 010 and 101 corresponding to 1T are removed, and six selection signals 000, 001, 011, 100, 110, and 111 are available.

Similarly, a five-tap structured Viterbi decoder using the (1,7) code needs only sixteen levels, and also sixteen selection signals are produced. As for an output of a normal Viterbi decoder 141, an additional separate configuration is not required for a generation of the selection signal 1431 since the output signal itself of the Viterbi decoder 141 is not produced in the form of 1T.

Another input signal of the channel identifier is an input signal of the equalizer 150. The input signal of the equalizer 150 has continuous values and is the target of decoding. This input signal has a real value that is different from the ideal base level. This input signal of the channel identifier passes through delays 1411, 1412, the number of which corresponds to the number of memories of the Viterbi decoder 141 and is then inputted into the level selector 1450. Based on the selection signal 1431, the level selector 1450 transmits the input signal to the respective average filters 1440. Each average filter 1440 corresponds to each level of the Viterbi decoder 141. Therefore, the number of the average filters 1440 may be equal to that of the levels of the Viterbi decoder 141. In this case as well, unnecessary paths may be removed.

The average filter 1440 calculates the average of the selected input signal 1441, 1442, 1443, for a given period and then produces the calculated average as a new level output 1451, 1452, 1453. Generally the average filter 1440 may use a low pass filter and its property of estimating a DC average value.

An alternative average filter 1440 may be embodied by means of the following equation 1.

$$L' = L + (I - L)/C$$ [Equation 1]

Here, L' means a level renewed by a newly entered input signal, and L means a former level. In addition, I and C mean a delayed input signal and a constant, respectively. As a constant C is increased, a renewing level L' varies very slightly and therefore a degree of tracking becomes reduced.

The detected new levels 1451, 1452, . . . shown in FIG. 14 are inputted into the adaptive processor, which creates a new coefficient of the equalizer 150, based on the level error to be detected. The level error to be detected means a difference between the output signal of the equalizer and a detected level. The new coefficient of the equalizer may be computed by renewing a former coefficient through a least mean square (LMS) method. This is represented in the following equation 2.

$$Wk+1 = Wk + 2*\mu ek*Xk \qquad [\text{Equation 2}]$$

Here, 'Wk+1', 'Wk', 'μ', 'ek', and 'Xk' mean the new coefficient of the equalizer, the former coefficient of the equalizer, a tracking velocity (a real number), a difference between the output signal of the equalizer and the detected level, and the input signal of the equalizer, respectively.

The input signal Xk of the equalizer 150 is inputted into the adaptive processor after being delayed by the delays because a time delay happens while the adaptive processor detects a new level.

The tracking velocity μ is a parameter that determines a degree of tracking, and may be adjustable by a suitable controller. As the tracking velocity μ is higher, a degree of tracking becomes increased.

The adaptive processor forces a channel to be stable. The channel identifier generates an optimum level of the Viterbi decoder 141 on the basis of the input signal of the equalizer 150. Furthermore, the adaptive processor adjusts again the coefficient of the filter by using the optimum level and thereby eliminates noises only while forcing the output signal of the equalizer 150 to nearly maintain the frequency feature of the original channel. This may allow offering much higher stability to a stabilization of coefficients or a divergence issue of the LMS algorithm that has caused problems.

Figure 15:
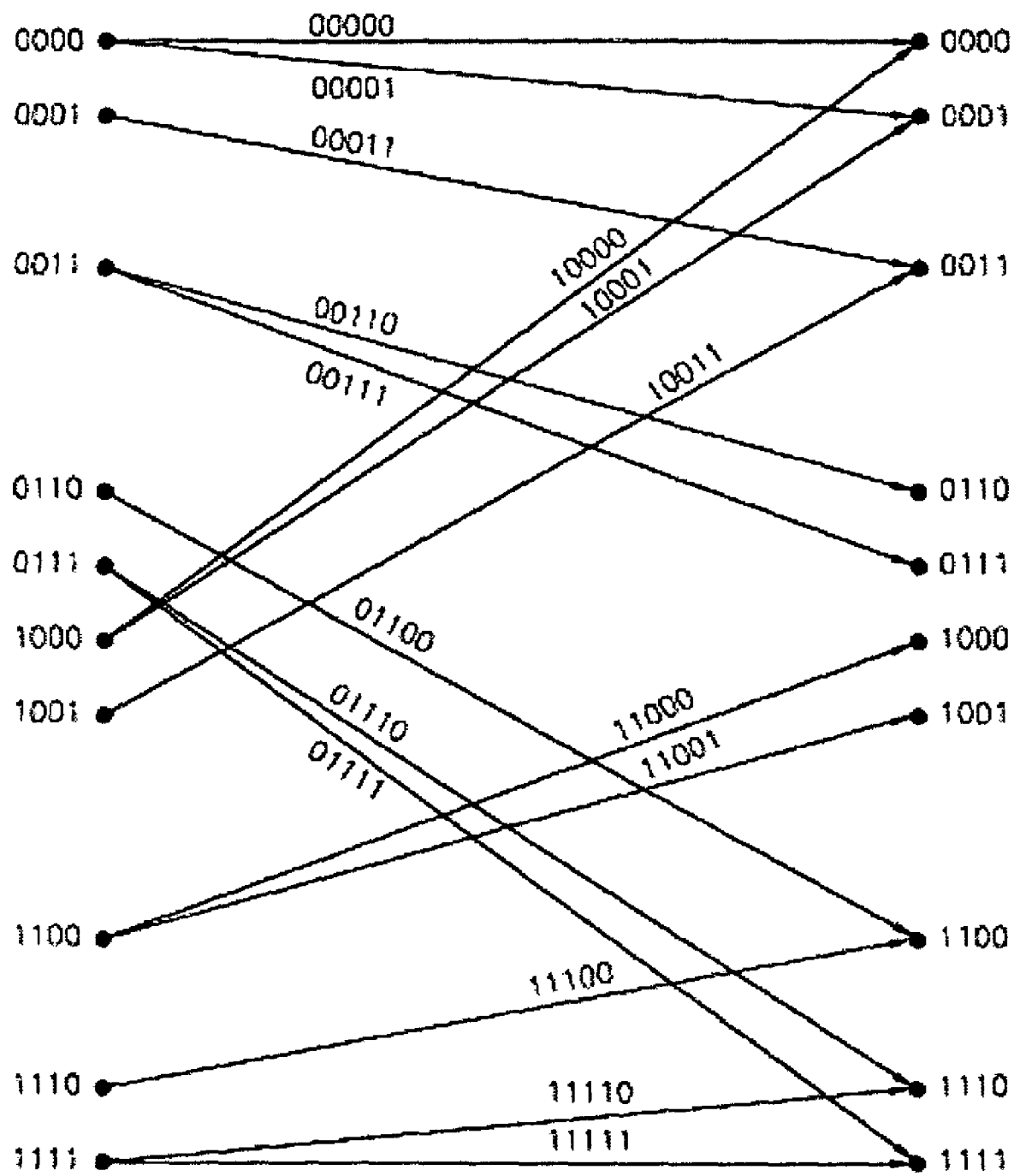
FIG. 15 is a view that illustrates a trellis diagram of a 5-tap Viterbi decoder of a (1,7) code according to an exemplary embodiment of the present invention.

FIG. 15 is a view that illustrates a trellis diagram of a 5-tap Viterbi decoder of a (1,7) code according to an exemplary embodiment of the present invention.

Referring to FIG. 15, it is appreciated that paths of the 1T signal are removed. Therefore, the total number of the paths is sixteen, and further, the number of the levels is also sixteen.

Figure 16:
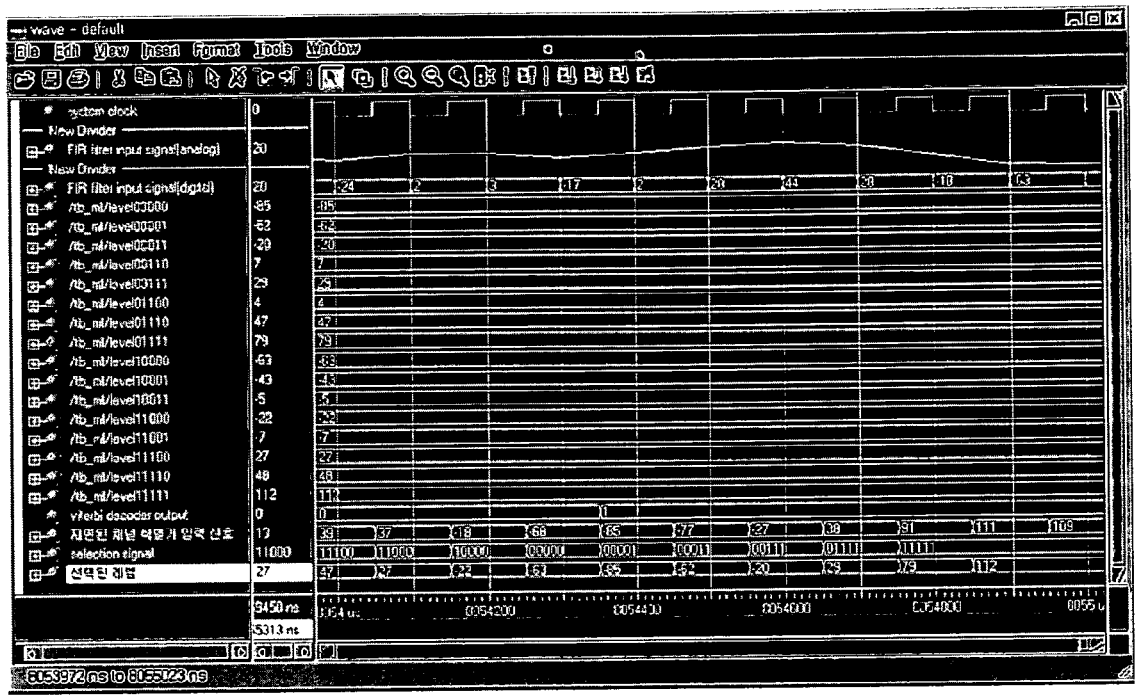
FIG. 16 is a view that illustrates a level estimation result by the Viterbi decoder in FIG. 15.

FIG. 16 is a view that illustrates a level estimation result by the Viterbi decoder in FIG. 15.

FIG. 16 shows sixteen ideal levels 00000, 00001, 00011, 00110, 00111,. The signals entered into the channel identifier are 39, 37, −18, −68, . . . , and here the selection signals are 11100, 11000, 10000, 00000, 00001,. The number of the selection signals is equal to that of the levels. By selecting the levels being currently computed according to the selection signals, the selected level signals come to 47 (in case of 11100), 27 (in case of 11000), −22 (in case of 10000), −63 (in case of 00000).

Namely, the selected level signals are quite similar with the input signals. Also, the most ideal level value may be obtained by calculating the average of the delayed input signals of the channel identifier by means of the above equation 1.

The aforesaid adaptive level error detector 160 may be embodied to involve the configuration and the operation of a channel identifier and an adaptive processor disclosed in the Korean Patent Publication No. 2005-0026320 entitled "Device and method for data reproduction".

Returning to FIG. 1, the signal quality measurer 170 includes the jitter controller 171 and the simulated bit error rate (SbER) controller 172. The signal quality measurer 170 may measure a jitter or an SbER as quality characteristics of the digital signal from the output signals of both the equalizer and the Viterbi decoder.

The jitter controller 171 detects a jitter between the digital signal and the defined system clock. Furthermore, the jitter controller 171 outputs an enable signal when the cycle of the digital signal satisfies predetermined conditions, and then executes a predetermined calculation on the detected jitter according to the enable signal. These are fully described referring to FIGS. 19 to 23.

Figures 18, 19:
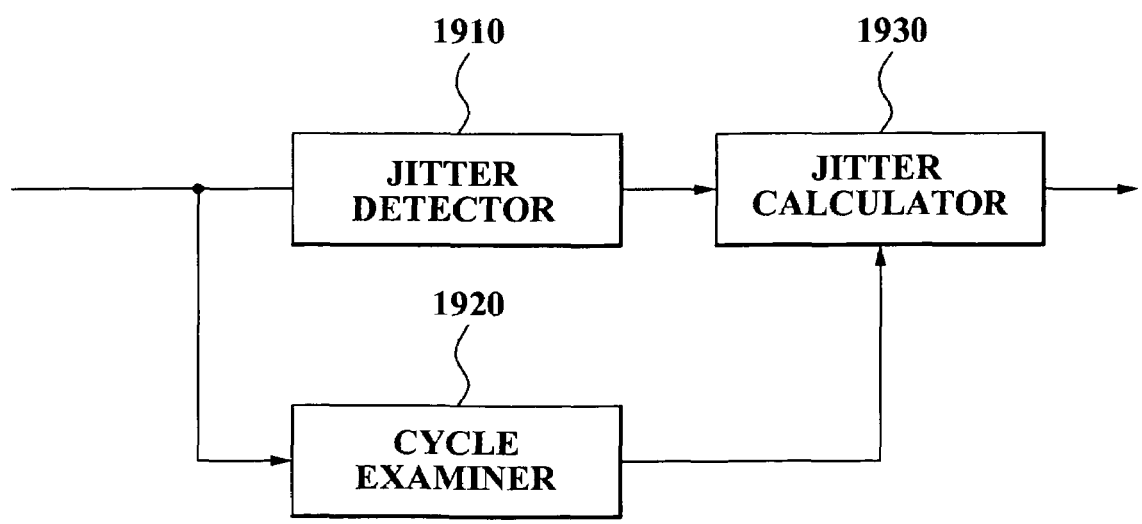
FIG. 18 is a view that illustrates a reference table according to an exemplary embodiment of the present invention.
FIG. 19 is a view that illustrates a jitter controller according to an exemplary embodiment of the present invention.

FIG. 19 is a view that illustrates a jitter controller according to an exemplary embodiment of the present invention.

Referring to FIG. 19, the jitter controller according to an embodiment includes a jitter detector 1910, a cycle examiner 1920, and a jitter calculator 1930.

The jitter detector 1910 and the cycle examiner 1920 receive the digital signals, respectively. The jitter detector 1910 detects a difference in time between the system clock outputted from the phase locked loop (130 shown in FIG. 1) and the digital signal. When the digital signal is synchronous with the system clock, a zero crossing point of the digital signal with offset removed coincides with the system clock. However, in actual practice, a difference between the zero crossing point and the system clock signal occurs. The jitter detector 1910 computes the above difference in time.

Since a jitter can be detected only when a sign of the input signal shifts, an additional control signal representing a sign shift may be also outputted. Namely, sometimes there is a need for a control signal that shows whether the jitter is in a plus direction or a minus direction.

The cycle examiner 1920 finds a cycle by measuring a time length from a former sign's shift to a new sign's shift when the sign of the input signal shifts. Also the cycle examiner 1920 outputs an enable signal when the cycle satisfies a defined condition. A general example of the defined condition is 'a case where the cycle is more than a fixed cycle'. In the above case, the enable signal is outputted only when the cycle of the input signals exceeds the fixed cycle so that a jitter calculation is executed only in that case.

Another example of the defined condition is to output the enable signal only when the cycle of the input signals is equal to a predetermined value. Additionally, in alternative examples, the enable signal may be outputted only when the cycle of the input signals is not equal to, more than, or not more than a predetermined value, or between predetermined values.

The jitter calculator 1930 executes a jitter calculation only when the cycle examiner 1920 satisfies a predetermined condition by using a jitter value outputted from the jitter detector 1910 and the output signal of the cycle examiner 1920. That is, the jitter calculation is not always executed whenever the jitter happens.

Figure 20:
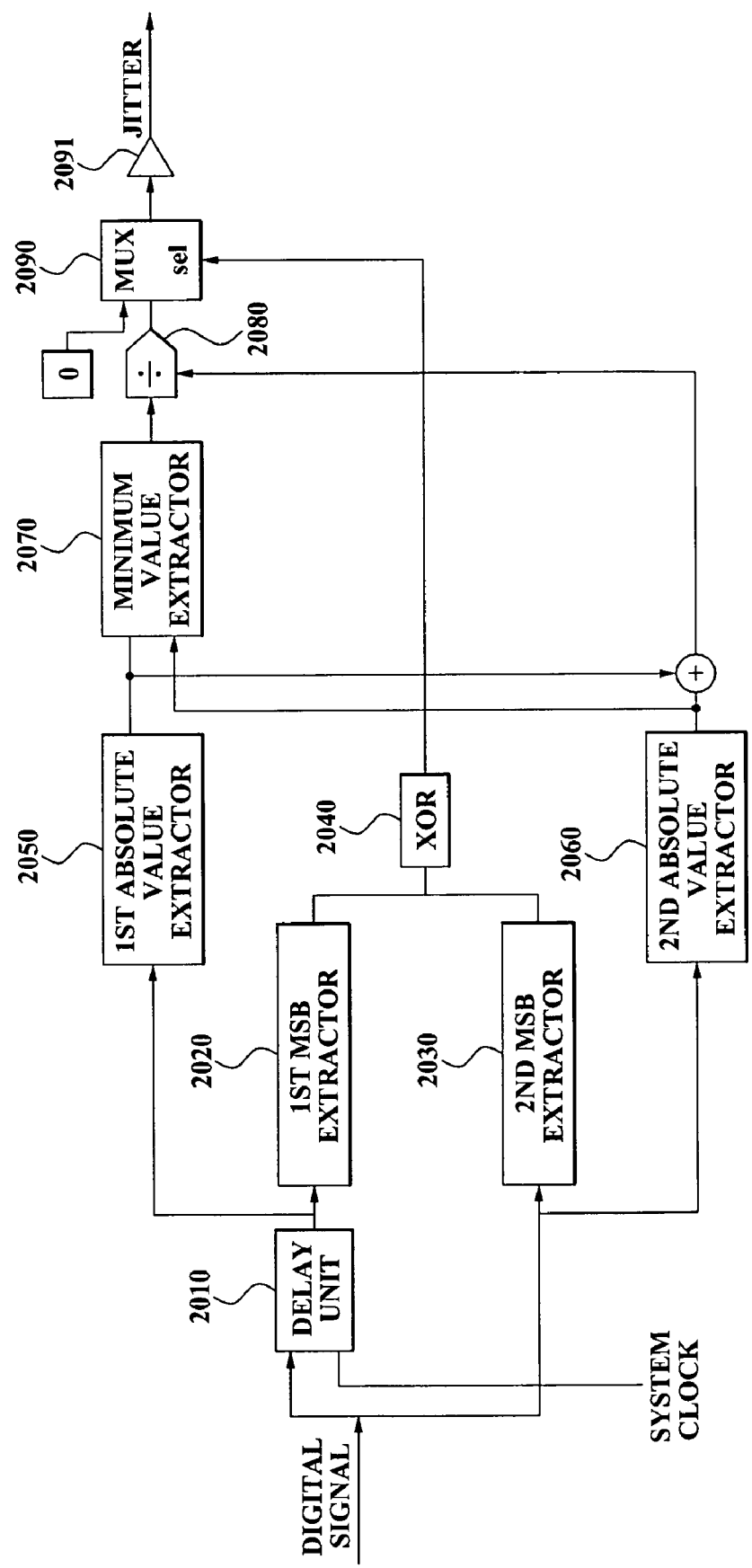
FIG. 20 is a view that illustrates a jitter detector of the jitter controller according to an exemplary embodiment of the present invention.

FIG. 20 is a view that illustrates a jitter detector of the jitter controller according to an exemplary embodiment of the present invention.

Referring to FIGS. 19 and 20, the jitter detector 1910 may be embodied by analog techniques or digital techniques, but this specification discloses an example of digital techniques.

In the jitter detector 1910 using digital techniques, the input signal from which the offset is removed is inputted in the form of quantized digital data. Since the jitter is produced when the sign of the input signal shifts, the jitter detector 1910 may determine in advance whether the sign of the input signal shifts or not.

Specifically, one of the digital signals is delayed by one system clock through a delay unit 2010 and the other is not delayed. A first most significant bit extractor 2020 and a second most significant bit extractor 2030 detect most significant bits (MSBs) respectively from the delayed signal and the non-delayed signal. Since a sign shift causes a variation of the MSB, an XOR gate 2040 receiving the detected MSBs outputs "1" when the sign shift happens. Namely, an output without the sign shift is "0" and an output with the sign shift is "1". So this signal may become a sign detection signal.

A method of computing the jitter is as follows. A first absolute value extractor 2050 and a second absolute value extractor 2060 receive the delayed signal and the non-delayed signal, respectively, and output their absolute values to a minimum value extractor 2070. The minimum value extractor 2070 selects and outputs a relatively smaller absolute value. A divider 2080 divides the selected output signal by an added value of the absolute values of two input signals. Then an output value from the divider 2080 is inputted into an MUX 2090. The MUX 2090 that normally outputs "0" selects the output signal of the divider 2080 when the sign shift happens. The MUX 2090 may multiply the output signal of the divider 2080 by a predetermined value.

Figure 21:
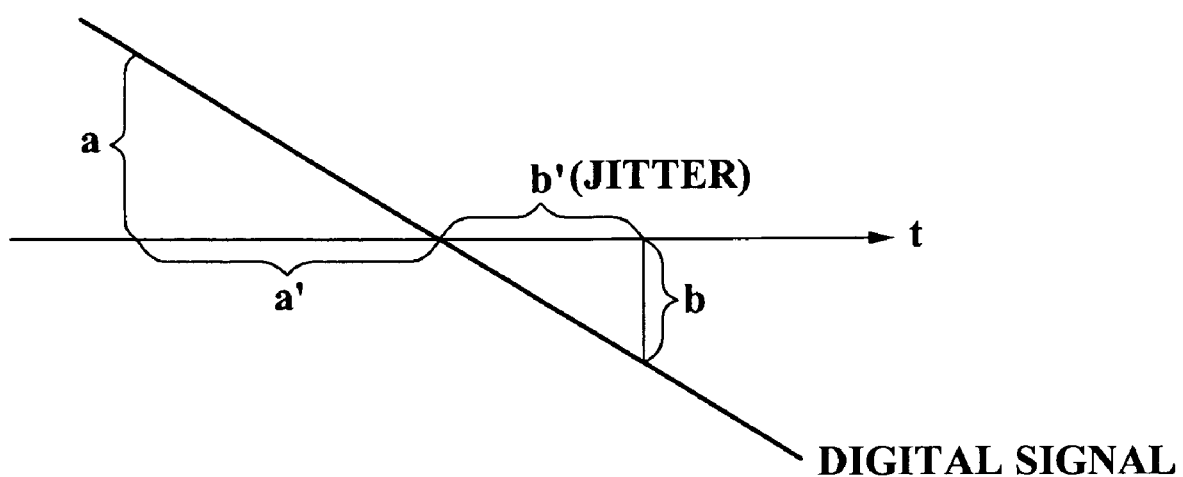
FIG. 21 is a view that illustrates a calculation method of a jitter value according to an exemplary embodiment of the present invention.

FIG. 21 is a view that illustrates a calculation method of a jitter value according to an exemplary embodiment of the present invention.

Referring to FIG. 21, referential characters "a" and "b" are values obtained by sampling the analog signal. The sum of referential characters "a'" and "b'" is fixed as the system clock. The jitter means a difference on a time axis between the clock signal and the input signal, and may be represented by a time difference between the zero crossing point of the input signal and the system clock.

Since a value of "b'" means a time difference between the system clock and the input signal, it may be jitter value. Supposing that a signal is linear around the zero crossing point, a relationship expression "a/a'=b/b'=(a+b)/(a'+b')" is obtained. Here, since a, b, and a'+b' (i.e., system clock) are already known values, the above expression can be rewritten as b'=b×(system clock)/(a+b). This calculation may be executed through the jitter detector shown in FIG. 20. As given above, the jitter value may be calculated by putting a smaller absolute data between two zero crossing points into a numerator and further putting an added value of two absolute values into a denominator.

Figure 22:
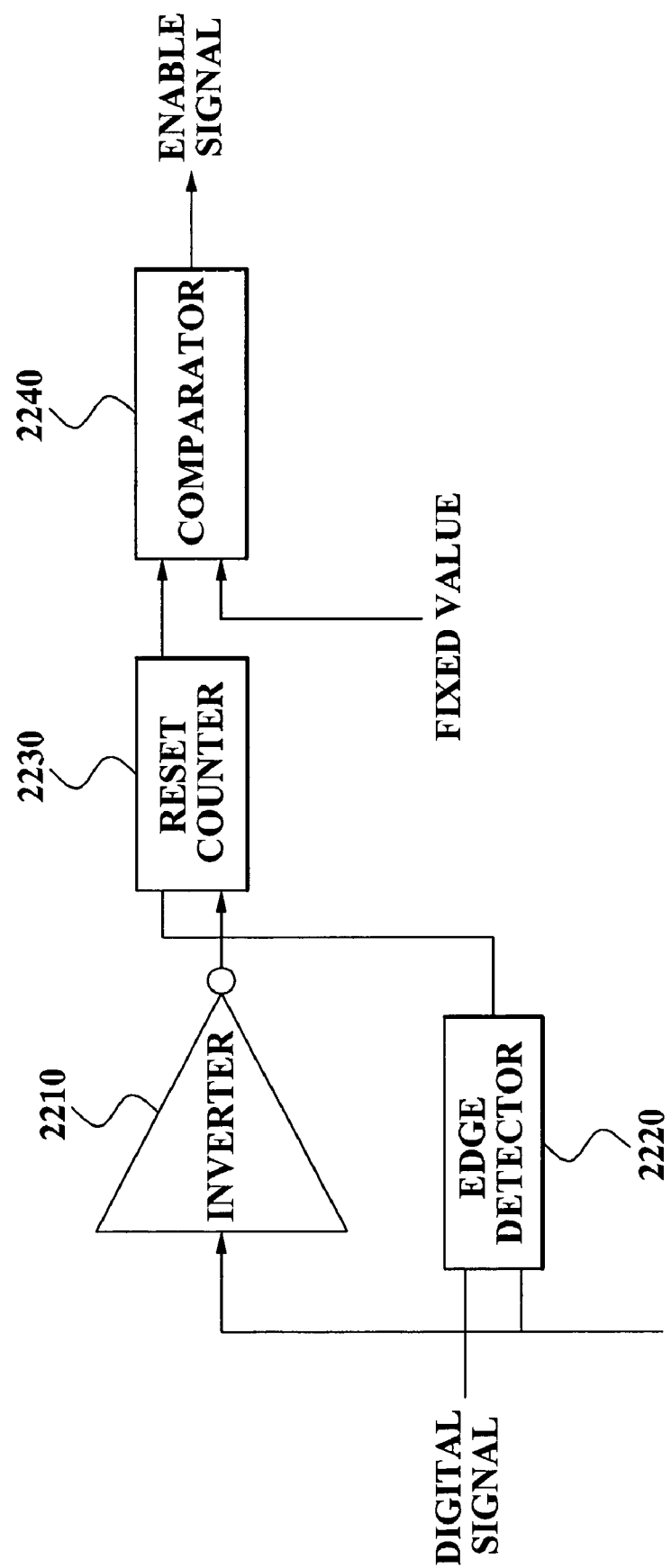
FIG. 22 is a view that illustrates a cycle examiner of the jitter controller according to an exemplary embodiment of the present invention.

FIG. 22 is a view that illustrates a cycle examiner of the jitter controller according to an exemplary embodiment of the present invention.

Referring to FIG. 22, the cycle examiner of an exemplary embodiment includes an inverter 2210, an edge detector 2220, a reset counter 2230, and a comparator 2240.

The edge detector 2220 judges whether the input signal passes the zero point when the input signal is entered. As discussed above, the edge detector 2220 may detect the MSBs from both the delayed signal and the non-delayed signal, and outputs after an XOR operation of the detected MSBs. A value "1" is outputted at an edge point where the sign shift happens. When an edge is detected, the edge detector 2220 sends the counter 2230 a signal showing that the edge is detected.

The counter 2230 adds a count value whenever the system clock is entered. This clock may be an inversed clock passing through the inverter 2210.

Figure 23:
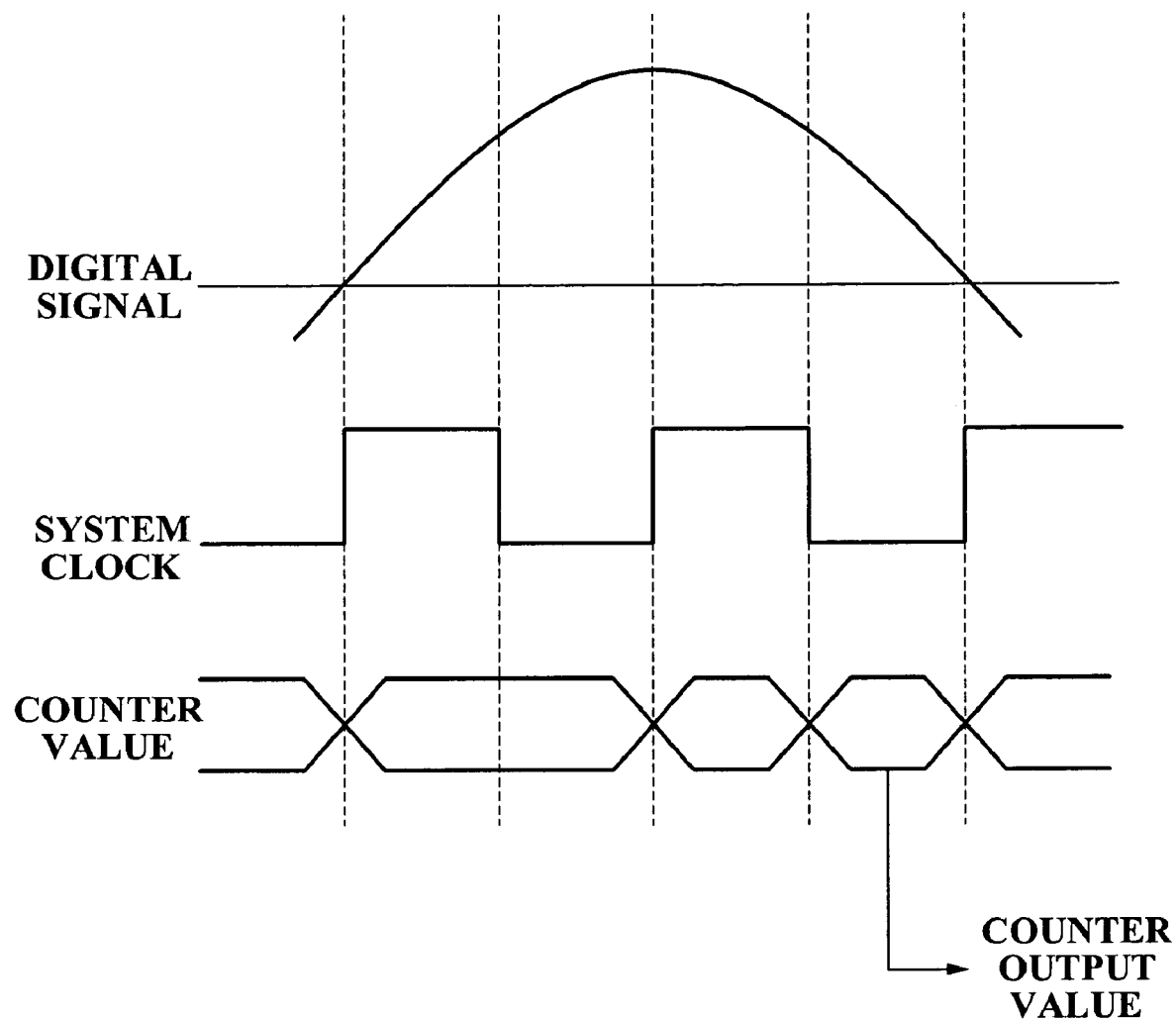
FIG. 23 is a view that illustrates a timing diagram of a counter of the cycle examiner according to an exemplary embodiment of the present invention.

FIG. 23 is a view that illustrates a timing diagram of a counter of the cycle examiner according to an exemplary embodiment of the present invention.

Referring to FIGS. 22 and 23, when an edge detection signal is entered, the counter 2230 is reset to "0". And a value just before reset is inputted into the comparator 2240. The comparator 2240 outputs an enable signal by comparing an output value of the counter 2230 with a fixed value. A micro controller or other external controller may change in advance the fixed value.

The enable signal, i.e., the output signal of the comparator 2240, may be used as an approval signal that decides whether to use the output of the cycle examiner or not. The comparator 2240 may be configured in a variety of forms. For example, the comparator 2240 may be configured to output the enable signal when a signal having a smaller cycle than a specific cycle is detected, when a signal having a greater cycle than a specific cycle is detected, when a signal having a specific cycle is detected, when a signal having a specific cycle is not detected, or when the cycle of a detected signal is between specific values. A micro controller or other external controller may regulate these cases.

Specifically, in case of input signals with 3T to 11T, the enable signal may be outputted when cycles with 3T to 11T are detected. In case of input signals with 3T to 11T and 14T, the enable signal may be outputted when cycles with 3T to 11T and 14T are detected. In case of input signals with 2T to 9T, the enable signal may be outputted when cycles with 2T to 9T are detected.

Furthermore, in case of input signals with 3T to 11T, the enable signal may be outputted when cycles with 4T to 11T are detected. In case of input signals with 3T to 11T and 14T, the enable signal may be outputted when cycles with 4T to 11T and 14T are detected. In case of input signals with 2T to 9T, the enable signal may be outputted when cycles with 3T to 9T are detected.

Additionally, in case of input signals with 3T to 11T, the enable signal may be outputted when cycles more than 3T are detected. In case of input signals with 3T to 11T and 14T, the enable signal may be outputted when cycles more than 3T are detected. In case of input signals with 2T to 9T, the enable signal may be outputted when cycles more than 2T are detected.

Additionally, in case of input signals with 3T to 11T, the enable signal may be outputted when cycles more than 4T are detected. In case of input signals with 3T to 11T and 14T, the enable signal may be outputted when cycles more than 4T are detected. In case of input signals with 2T to 9T, the enable signal may be outputted when cycles more than 3T are detected.

Returning to FIG. 19, the jitter calculator 1930 receives the detected jitter value and the approval signal of the cycle examiner 1920 and then executes a calculation of a real jitter value. The jitter calculator 1930 outputs an average of the jitters in specific cycles when predetermined conditions are satisfied. The cycle examiner 1920 may establish these conditions. Generally the real jitter value is an average of jitter values obtained within specific cycles, and computed by a micro controller or any other arithmetic hardware under particular conditions that a system designer requires. 'To output an average jitter value when a signal more than 4T happens n times' is an example of such conditions. Generally possible conditions are as follows.

To output an average jitter value when a specific T happens N times.

To output an average jitter value when a cycle more than a specific T happens N times.

To output an average jitter value when a cycle less than a specific T happens N times.

To output an average jitter value when a cycle between T1 and T2 happens N times.

To output an average jitter value when a non-T signal happens N times.

To output an average jitter value for every specific time.

Here, T, T1, T2, N are optionally selectable values by a micro controller or any other controller. Furthermore, the above conditions may be variously established by changing the conditions of the cycle examiner 1920.

The aforesaid jitter controller 171 may be embodied to involve the configuration and the operation of "apparatus and method of jitter detection" disclosed in the Korean Patent Publication No. 2004-0099951.

Returning again to FIG. 1, the SbER controller 172 of the signal quality measurer 170 computes quality characteristics (i.e., SbER) of the digital signal by adding products of a probability ($C_T$) that a pattern T of the digital signal happens, a probability (erf(0)) that the pattern T is detected corresponding to a pattern F of the digital signal, and a Hamming distance between the pattern T and the pattern F. This is discussed hereinafter referring to FIGS. 17 and 18.

Figure 17:
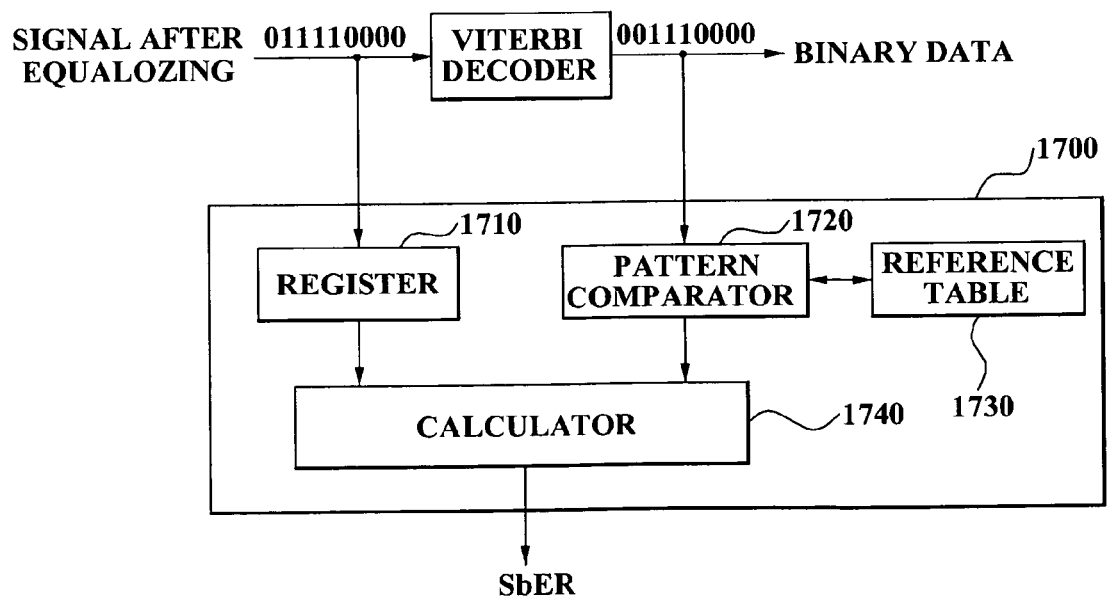
FIG. 17 is a block diagram that illustrates an SbER controller of a signal quality measurer according to an exemplary embodiment of the present invention.

FIG. 17 is a block diagram that illustrates an SbER controller of a signal quality measurer according to an exemplary embodiment of the present invention.

Referring to FIG. 17, the SbER controller 1700 of an exemplary embodiment includes a register 1710, a pattern comparator 1720, a reference table 1730, and a calculator 1740.

The equalized input signal is inputted into the Viterbi decoder. Furthermore, the input signal is transmitted to the SbER controller 1700 and recorded into the register 1710.

Binary data outputted from the Viterbi decoder are inputted into the pattern comparator 1720. The pattern comparator 1720 compares patterns of the binary data with the reference table 1730 exemplarily shown in FIG. 18. Thereafter, the calculator 1740 calculates a difference between two Euclidean distances given below, computes the Hamming distance ($H_{T,F}$), and computes the SbER using the following equation 3.

Equalized input signal—pattern T in FIG. 18 (right pattern)

Equalized input signal—pattern F in FIG. 18 (erroneous pattern)

$$SbER = \Sigma C_T * erf(0) * H_{T,F} \quad \text{[Equation 3]}$$

$C_T$: A probability that a pattern T of the digital signal happens.

erf(0): A probability that the pattern T is detected corresponding to a pattern F of the digital signal.

$H_{T,F}$: A Hamming distance between the pattern T and the pattern F.

By computing the SbER through the Equation 3, the SbER controller 1700 can measure quality characteristics of the digital signal. The aforesaid SbER controller 1700 may be embodied to involve the configuration and the operation of "apparatus and method of jitter detection" disclosed in the Korean Patent Publication No. 2004-0099951 and those of "signal quality evaluation method, information recording and reproducing system, recording compensation method, and information medium" disclosed in the Japanese Patent Publication No. 2003-151219.

As fully discussed hereinbefore, the optical disc reproducing apparatus of the present invention is configured with a combination of the asymmetry compensator, the phase locked loop, the binary module, the equalizer, the adaptive level error detector, and the signal quality measurer. A disc reproduction realized by combining featured configurations and operations of the above elements may create a synergy effect.

Specifically, the optical disc reproducing apparatus of an exemplary embodiment of the present invention may allow a disc reproduction supporting both RLL(1,10) and RLL(2,10) codes.

Furthermore, the optical disc reproducing apparatus of an exemplary embodiment of the present invention may allow an effective disc reproduction under a high-density environment more than 15 GB in a 12 cm diameter disc by supporting a 5-Tap PRML structure.

Additionally, the optical disc reproducing apparatus of an exemplary embodiment of the present invention may effectively detect frequency errors under a high-density environment with a frequent ISI and a high noise.

Additionally, the optical disc reproducing apparatus of an exemplary embodiment of the present invention may execute an asymmetric compensating operation in response to an RLL(1,10) environment.

Additionally, the optical disc reproducing apparatus of an exemplary embodiment of the present invention may execute a minimum T signal compensating operation under 3T and 2T environments and in response to an RLL(1,0) code.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An optical disc reproducing apparatus for correcting asymmetric errors in data reproduced from optical discs, comprising:

an asymmetry compensator which detects sampling signals from received digital signals, the sampling signals being determined when a change in polarity occurs in the digital signals, the digital signals being sampled a predetermined number of times in a sampling region every half cycle of an analog signal, wherein the predetermined number of times is at least one; and wherein the asymmetry compensator calculates asymmetric error values from the sampling signals, counts the error values, and corrects a level of the digital signals based on the counted asymmetric error values;

a binary module which includes a Viterbi decoder that detects binary data from the digital signals, a slicer which determines the binary data depending on a predetermined threshold value, and a minimum T compensator which corrects the digital signal with a minimum signal having a unit cycle;

an equalizer which equalizes a specific frequency of the digital signal; and an adaptive level error detector which detects a base level of the Viterbi decoder from both an input signal into the equalizer and an output signal from the Viterbi decoder, and computes a filtering coefficient of the equalizer from the base level.

2. The apparatus of claim 1 further comprising an A/D converter which converts RF signals obtained from an optical disc to the digital signals.

3. The apparatus of claim 1, wherein the predetermined number of times the digital signal is sampled corresponds to 4T sampling signals.

4. The apparatus of claim 3, wherein the asymmetry compensator adds first, fourth, fifth, and eighth digital signals among the 4T sampling signals to produce a sum, and then computes asymmetric error values based on the sum.

5. The apparatus of claim 1, further comprising a phase locked loop which includes a frequency detector that counts and detects run-length signals from the digital signals and corrects frequency errors of the digital signals.

6. The apparatus of claim 5, wherein the frequency detector counts and detects run-length signals from the sampling digital signals during a frequency detection cycle according to a run-length distribution density depending on a channel coding feature, generates frequency errors during the frequency detection cycle through the count value of the run-length signals and predetermined threshold values, and corrects the frequency errors of the digital signals.

7. The apparatus of claim 1, wherein a partial response (PR) type of the Viterbi decoder is PR (a, b, c, d, e).

8. The apparatus of claim 1, wherein the adaptive level error detector detects a base level of the Viterbi decoder from both an input signal into the equalizer and an output signal from the Viterbi decoder, and computes a filtering coefficient of the equalizer from the base level, the input signal of the equalizer, and the output signal of the equalizer.

9. The apparatus of claim 1, wherein the Viterbi decoder has a 5-tap type and a 16 level, and wherein the binary module supports both RLL(1,10) and RLL(2,10) codes, and selectively uses an input of the adaptive level error detector.

10. The apparatus of claim 1, wherein the minimum T compensator corrects the digital sampling signal with a minimum signal having a unit cycle when the digital sampling signal has a smaller cycle than a unit cycle of the minimum signal corresponding to a code of the optical disc.

11. The apparatus of claim 1, further comprising a signal quality measurer which measures a jitter or an SbER of the digital signal.

12. The apparatus of claim 1, wherein the apparatus supports a HD-DVD with blue ray wavelength, a DVD with red ray wavelength, and a CD with IR wavelength.

13. The apparatus of claim 1, wherein the asymmetry compensator executes asymmetric error compensation in response to one of multiple run-length limited code environments.

* * * * *